US011027262B2

(12) United States Patent
Carrette et al.

(10) Patent No.: US 11,027,262 B2
(45) Date of Patent: Jun. 8, 2021

(54) CATALYST CONTAINING A FURAN COMPOUND AND USE THEREOF IN A HYDROPROCESSING AND/OR HYDROCRACKING METHOD

(71) Applicant: IFP Energies Nouvelles, Rueil-Malmaison (FR)

(72) Inventors: Pierre Louis Carrette, Lyons (FR); Damien Delcroix, St. Maurice l'Exil (FR)

(73) Assignee: IFP Energies Nouvelles, Rueil Malmaison (FR)

( * ) Notice: Subject to any disclaimer, the term of this patent is extended or adjusted under 35 U.S.C. 154(b) by 0 days.

(21) Appl. No.: 16/765,961

(22) PCT Filed: Nov. 12, 2018

(86) PCT No.: PCT/EP2018/080959
§ 371 (c)(1),
(2) Date: May 21, 2020

(87) PCT Pub. No.: WO2019/101564
PCT Pub. Date: May 31, 2019

(65) Prior Publication Data
US 2020/0391191 A1 Dec. 17, 2020

(30) Foreign Application Priority Data
Nov. 22, 2017 (FR) ........................ 1761063

(51) Int. Cl.
| | | |
|---|---|---|
| *B01J 27/19* | (2006.01) | |
| *B01J 6/00* | (2006.01) | |
| *B01J 31/02* | (2006.01) | |
| *B01J 37/02* | (2006.01) | |
| *B01J 37/20* | (2006.01) | |
| *B01J 37/28* | (2006.01) | |
| *B01J 38/02* | (2006.01) | |
| *C10G 47/12* | (2006.01) | |
| *B01J 21/04* | (2006.01) | |
| *B01J 21/12* | (2006.01) | |

(52) U.S. Cl.
CPC .............. *B01J 27/19* (2013.01); *B01J 6/001* (2013.01); *B01J 31/0208* (2013.01); *B01J 31/0229* (2013.01); *B01J 37/0203* (2013.01); *B01J 37/0238* (2013.01); *B01J 37/20* (2013.01); *B01J 37/28* (2013.01); *B01J 38/02* (2013.01); *C10G 47/12* (2013.01); *B01J 21/04* (2013.01); *B01J 21/12* (2013.01)

(58) Field of Classification Search
CPC ........ B01J 21/185; B01J 23/10; B01J 27/188; B01J 37/0236; B01J 37/036; B01J 37/04; C10G 7/06; C10G 2400/04; Y02E 50/10; Y02P 30/20
See application file for complete search history.

(56) References Cited

U.S. PATENT DOCUMENTS

| | | |
|---|---|---|
| 6,288,006 B1 | 9/2001 | Arretz |
| 9,212,324 B2 | 12/2015 | Cholley et al. |
| 9,821,302 B2 | 11/2017 | Cholley et al. |
| 10,399,070 B2 | 9/2019 | Carrette |
| 2005/0014635 A1* | 1/2005 | Zhou ............... H01M 4/926 502/159 |
| 2008/0194892 A1 | 8/2008 | Cholley et al. |
| 2015/0259611 A1 | 9/2015 | Gabrielov et al. |
| 2016/0008799 A1 | 1/2016 | Cholley et al. |
| 2018/0290131 A1 | 10/2018 | Carrette |

FOREIGN PATENT DOCUMENTS

| | | |
|---|---|---|
| CN | 106140321 A | 11/2016 |
| EP | 0958054 B1 | 3/2001 |
| WO | 2006/077326 A1 | 7/2006 |
| WO | 2016/173759 A1 | 11/2016 |

OTHER PUBLICATIONS

International Search Report dated Dec. 18, 2018 issued in corresponding PCT/EP2018/080959 application (3 pages).
English Abstract of CN 106140321 A published Nov. 23, 2016.

* cited by examiner

*Primary Examiner* — Brian A McCaig
(74) *Attorney, Agent, or Firm* — Millen White Zelano & Branigan, PC; Brion P. Heaney

(57) ABSTRACT

The invention relates to a catalyst comprising an alumina-, silica- or silica-alumina-based support, at least one group VIII element, at least one group VIB element, and a furan compound. The invention also relates to the method for producing said catalyst and to the use thereof in a hydrotreating and/or hydrocracking method.

19 Claims, No Drawings

CATALYST CONTAINING A FURAN COMPOUND AND USE THEREOF IN A HYDROPROCESSING AND/OR HYDROCRACKING METHOD

The invention relates to a catalyst that is additive-impregnated with a furan compound, to the method for preparing same and to the use thereof in the hydrotreating and/or hydrocracking field.

Usually, a catalyst for the hydrotreating of hydrocarbon-based fractions has the function of removing the sulfur-based or nitrogen-based compounds contained therein in order, for example, to make a petroleum product meet the required specifications (sulfur content, aromatic content, etc.) for a given application (motor vehicle fuel, gasoline or gas oil, domestic fuel oil, jet fuel). It may also be a matter of pretreating this feedstock so as to remove impurities therefrom or to hydrogenate it before subjecting it to various transformation processes to modify the physicochemical properties thereof, for instance reforming, vacuum distillate hydrocracking, catalytic cracking, or atmospheric or vacuum residue conversion processes. The composition and use of hydrotreating catalysts are particularly well described in the article by B. S. Clausen, H. T. Topsøe and F. E. Massoth, taken from the publication Catalysis Science and Technology, volume 11 (1996), Springer-Verlag.

Conventional hydrotreating catalysts generally comprise an oxide support and an active phase based on Group VIB and VIII metals in the oxide forms thereof and also phosphorus. The preparation of these catalysts generally comprises a step of impregnating the metals and the phosphorus on the support, followed by drying and calcining enabling the active phase to be obtained in the oxide forms thereof. Before the use thereof in a hydrotreating and/or hydrocracking reaction, these catalysts are generally subjected to sulfurization in order to form the active species.

The addition of an organic compound to the hydrotreating catalysts to improve their activity has been recommended by those skilled in the art, notably for catalysts which have been prepared by impregnation followed by drying without subsequent calcination. These catalysts are often referred to as "additive-impregnated dried catalysts".

Many documents describe the use of various ranges of organic compounds as additives, such as nitrogen-based organic compounds and/or oxygen-based organic compounds.

One family of compounds that is now well known from the literature relates to chelating nitrogen-based compounds (EP 0 181 035, EP 1 043 069 and U.S. Pat. No. 6,540,908) with, by way of example, ethylenediaminetetraacetic acid (EDTA), ethylenediamine, diethylenetriamine or nitrilotriacetic acid (NTA).

In the family of oxygen-based organic compounds, the use of monools, diols or polyols which are optionally etherified is described in WO 96/41848, WO 01/76741, U.S. Pat. Nos. 4,012,340, 3,954,673, EP 601 722 and WO 2005/035691.

Several patents are also found that claim the use of carboxylic acids (EP 1 402 948, EP 0 482 817). In particular, in EP 0482 817, citric acid, and also tartaric, butyric, hydroxyhexanoic, malic, gluconic, glyceric, glycolic and hydroxybutyric acids have been described. The specificity lies in the drying, which must be performed at a temperature below 200° C.

The prior art mentions less frequently additives including ester functions (EP 1 046 424, WO 2006/077326).

US 2014/0353213 describes the use of lactams, cyclic esters (of lactone type) or cyclic ethers (of oxacycloalkane type).

Irrespective of the compounds chosen, the modifications induced do not always make it possible to sufficiently increase the performance of the catalyst in order to meet the specifications concerning the sulfur and/or nitrogen contents of fuels. Furthermore, it is often very difficult to deploy them industrially since the methods are so complex to implement.

Consequently, it appears essential, for catalyst manufacturers, to find novel hydrotreating and/or hydrocracking catalysts with improved performance.

SUMMARY

The invention relates to a catalyst comprising a support based on alumina or silica or silica-alumina, at least one Group VIII element, at least one Group VIB element and a furan compound.

The Applicant has, in point of fact, found that the use of a furan compound as organic additive on a catalyst containing at least one Group VIII element and at least one Group VIB element makes it possible to obtain a hydrotreating and/or hydrocracking catalyst which shows improved catalytic performance.

Specifically, the catalyst according to the invention shows increased activity relative to the known catalysts that are not additive-impregnated and the known additive-impregnated dried catalysts. Typically, by means of increasing the activity, the temperature required to achieve a desired sulfur or nitrogen content (for example 10 ppm of sulfur in the case of a gas oil feedstock, in ULSD or ultra-low sulfur diesel mode) may be lowered. Similarly, the stability is increased, since the cycle time is prolonged by means of reducing the required temperature.

According to one variant, the furan compound is of formula (I)

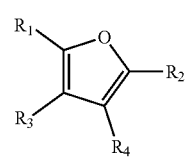

(I)

in which each of said radicals R1, R2, R3 and R4 is chosen from a hydrogen atom, a linear or branched or cyclic hydrocarbon-based radical including from 1 to 20 carbon atoms, a function from among: aldehyde —C(O)H, ketone —C(O)R$_5$, carboxylic acid —COOH, ester —COOR$_6$, hydroxymethyl —CH$_2$OH, alkoxymethyl —CH$_2$OR$_7$, halomethyl —CH$_2$X with X=Cl, Br or I, acyl halide —COX with X=Cl, Br or I, alcohol —OH, ether OR$_8$, thiomethyl —CH$_2$SH, (alkylsulfanyl)methyl —CH$_2$SR$_9$, thioester —COSR$_{10}$ with R$_5$ to R$_{10}$ representing a linear or branched or cyclic hydrocarbon-based radical of 1 to 20 carbon atoms, each of said radicals R1, R2, R3, R4, R5, R6, R7, R8, R9 and R10 possibly also including a heteroatom, a halogen and/or at least one function chosen from a hydroxyl function, an aldehyde function, a ketone function, a carboxylic function, an alkanoate function, a thiol function, an alkylsulfanyl function, a thioalkanoate function and an amine function.

According to this variant, the radicals R3 and R4 advantageously represent, respectively, a hydrogen atom.

According to one variant, the furan compound is chosen from 2-methylfuran, 2,5-dimethylfuran, furfuryl alcohol, 1-(2-furyl)ethanol, 2,5-bis(hydroxymethyl)furan, 5-(hydroxymethyl)furfural, 5-hydroxymethyl-2-furoic acid, 2-methoxyfuran, 2-furaldehyde, 5-methyl-2-furaldehyde, 5-(ethoxymethyl)furan-2-carboxaldehyde, 5-acetoxymethyl-2-furaldehyde, 5-chloromethylfurfural, 2,5-diformylfuran, 2-acetylfuran, 2-acetyl-5-methylfuran, furoic acid, 5-ethylfuroic acid, 5-formyl-2-furoic acid, 2,5-furandicarboxylic acid, dimethyl 2,5-furandicarboxylate, methyl 2-furoate, methyl 5-methyl-2-furoate, furfuryl acetate, furfuryl propionate, furfuryl mercaptan, 2-[(methylsulfanyl)methyl] furan, 2-furanmethanethiol formate, furfuryl thioacetate, furfuryl thiopropionate, methyl 2-thiofuroate, ethyl 3-(furfurylthio)propionate, furfurylamine, 2-furoyl chloride.

According to another variant, the furan compound is a polyfuran compound of formula (II)

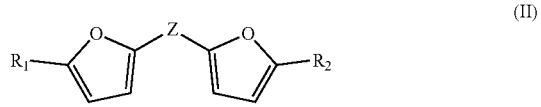

(II)

in which Z is chosen from an oxygen atom, a sulfur atom, a linear or branched or cyclic hydrocarbon-based radical including from 1 to 20 carbon atoms and which may also include a heteroatom, a halogen and/or at least one function chosen from a hydroxyl function, an aldehyde function, a ketone function, a carboxylic function, an alkanoate function, a thiol function, an alkylsulfanyl function, a thioalkanoate function and an amine function, and in which each of the radicals R1 and R2 is chosen from a hydrogen atom, a linear or branched or cyclic hydrocarbon-based radical including from 1 to 20 carbon atoms, a function from among: aldehyde —C(O)H, ketone —C(O)R$_5$, carboxylic acid —COOH, ester —COOR$_6$, hydroxymethyl —CH$_2$OH, alkoxymethyl —CH$_2$OR7, halomethyl —CH$_2$X with X=Cl, Br or I, acyl halide —COX with X=Cl, Br or I, alcohol —OH, ether OR$_8$, thiomethyl —CH$_2$SH, (alkylsulfanyl)methyl —CH$_2$SR$_9$, thioester —COSR$_{10}$ with R$_5$ to R$_{10}$ representing a linear or branched or cyclic hydrocarbon-based radical of 1 to 20 carbon atoms, each of said radicals R1, R2, R5, R6, R7, R8, R9 and R10 possibly also including a heteroatom, a halogen and/or at least one function chosen from a hydroxyl function, an aldehyde function, a ketone function, a carboxylic function, an alkanoate function, a thiol function, an alkylsulfanyl function, a thioalkanoate function and an amine function.

According to this variant, the furan compound is chosen from bis(5-formylfurfuryl) ether, 2,2'-(thiodimethylene)difuran and 5,5-bis(5-methyl-2-furanyl)-2-pentanone.

According to one variant, the content of Group VIB element is between 5% and 40% by weight expressed as Group VIB metal oxide relative to the total weight of the catalyst and the content of Group VIII element is between 1% and 10% by weight expressed as Group VIII metal oxide relative to the total weight of the catalyst.

According to one variant, the mole ratio of Group VIII element to Group VIB element in the catalyst is between 0.1 and 0.8.

According to one variant, the catalyst also contains phosphorus, the phosphorus content being between 0.1% and 20% by weight expressed as P$_2$O$_5$ relative to the total weight of the catalyst and the mole ratio of phosphorus to the Group VIB element in the catalyst is greater than or equal to 0.05.

According to one variant, the content of furan compound is between 1% and 45% by weight relative to the total weight of the catalyst.

According to one variant, the catalyst also contains an organic compound other than the furan compound containing oxygen and/or nitrogen and/or sulfur.

According to this variant, the organic compound is chosen from a compound including one or more chemical functions chosen from carboxylic, alcohol, thiol, thioether, sulfone, sulfoxide, ether, aldehyde, ketone, ester, carbonate, amine, nitrile, imide, oxime, urea and amide functions.

According to this variant, the organic compound other than the furan compound is chosen from γ-valerolactone, 2-acetylbutyrolactone, triethylene glycol, diethylene glycol, ethylene glycol, ethylenediaminetetraacetic acid (EDTA), maleic acid, malonic acid, citric acid, γ-ketovaleric acid, dimethylformamide, N-methylpyrrolidone, propylene carbonate, 2-methoxyethyl 3-oxobutanoate, 2-methacryloyloxyethyl 3-oxobutanoate, bicine, tricine or a lactam.

According to one variant, the catalyst is at least partially sulfurized.

The invention also relates to processes for preparing the catalyst according to the invention as described in the claims.

The invention also relates to the use of the catalyst according to the invention in a process for the hydrotreating and/or hydrocracking of hydrocarbon-based fractions.

Hereinbelow, the groups of chemical elements are given according to the CAS classification (CRC Handbook of Chemistry and Physics, published by CRC Press, Editor in Chief D. R. Lide, 81$^{st}$ edition, 2000-2001). For example, Group VIII according to the CAS classification corresponds to the metals of columns 8, 9 and 10 according to the new IUPAC classification.

The term "hydrotreating" refers to reactions notably encompassing hydrodesulfurization (HDS), hydrodeazotization (HDN) and hydrogenation of aromatics (HOA).

DETAILED DESCRIPTION OF THE INVENTION

Catalyst

The catalyst according to the invention is a catalyst that is additive-impregnated with a furan compound. More particularly, the catalyst according to the invention comprises a support based on alumina or silica or silica-alumina, at least one Group VIII element, at least one Group VIB element and a furan compound.

The term "furan compound" means any compound containing at least one aromatic ring composed of four carbon atoms and one oxygen atom.

The catalyst according to the invention may be a fresh catalyst, i.e. a catalyst that has not been used beforehand as catalyst in a catalytic unit and notably in hydrotreating and/or hydrocracking.

The catalyst according to the invention may also be a rejuvenated catalyst. The term "rejuvenated catalyst" means a catalyst which has been used as catalyst in a catalytic unit and notably in hydrotreatment and/or hydrocracking and which has been subjected to at least one step of partial or total removal of coke, for example by calcining (regeneration). This regenerated catalyst is then additive-impregnated with at least one furan compound to obtain the rejuvenated catalyst. This rejuvenated catalyst may contain one or more other organic additives which may be added before, after or at the same time as the furan compound.

The hydrogenating function of said catalyst, also known as the active phase, is provided by at least one Group VIB element and by at least one Group VIII element.

The preferred Group VIB elements are molybdenum and tungsten. The preferred Group VIII elements are non-noble elements and in particular cobalt and nickel. Advantageously, the hydrogenating function is chosen from the group formed by the combinations of the elements cobalt-molybdenum, nickel-molybdenum, nickel-tungsten or nickel-cobalt-molybdenum, or nickel-molybdenum-tungsten.

In the case where substantial hydrodesulfurization or hydrodeazotization activity or substantial hydrogenation activity on aromatics is desired, the hydrogenating function is advantageously provided by the combination of nickel and molybdenum; a combination of nickel and tungsten in the presence of molybdenum may also be advantageous. In the case of feedstocks such as vacuum distillates or heavier distillates, combinations of cobalt-nickel-molybdenum type may be advantageously used.

The total content of Group VIB and Group VIII elements is advantageously greater than 6% by weight expressed as oxide relative to the total weight of the catalyst.

The content of Group VIB element is between 5% and 40% by weight, preferably between 8% and 35% by weight, and more preferably between 10% and 30% by weight expressed as Group VIB metal oxide relative to the total weight of the catalyst.

The content of Group VIII element is between 1% and 10% by weight, preferably between 1.5% and 9% by weight, and more preferably between 2% and 8% by weight expressed as Group VIII metal oxide relative to the total weight of the catalyst.

The mole ratio of Group VIII element to Group VIB element in the catalyst is preferentially between 0.1 and 0.8, preferably between 0.15 and 0.6 and even more preferably between 0.2 and 0.5.

The catalyst according to the invention advantageously also comprises phosphorus as dopant. The dopant is an added element which in itself has no catalytic nature but which increases the catalytic activity of the active phase.

The phosphorus content in said catalyst is preferably between 0.1% and 20% by weight expressed as $P_2O_5$ relative to the total weight of the catalyst, preferably between 0.2% and 15% by weight expressed as $P_2O_5$, and very preferably between 0.3% and 11% by weight expressed as $P_2O_5$.

The mole ratio of phosphorus to the Group VIB element in the catalyst is greater than or equal to 0.05, preferably greater than or equal to 0.07, preferably between 0.08 and 1, preferably between 0.01 and 0.9 and very preferably between 0.15 and 0.8.

The catalyst according to the invention, with or without phosphorus, may advantageously also contain at least one dopant chosen from boron, fluorine and a mixture of boron and fluorine.

When the catalyst contains boron, the boron content is preferably between 0.1% and 10% by weight expressed as boron oxide relative to the total weight of the catalyst, preferably between 0.2% and 7% by weight and very preferably between 0.2% and 5% by weight.

When the catalyst contains fluorine, the fluorine content is preferably between 0.1% and 10% by weight expressed as fluorine relative to the total weight of the catalyst, preferably between 0.2% and 7% by weight and very preferably between 0.2% and 5% by weight.

When the catalyst contains boron and fluorine, the total content of boron and fluorine is preferably between 0.1% and 10% by weight expressed as boron oxide and fluorine relative to the total weight of the catalyst, preferably between 0.2% and 7% by weight and very preferably between 0.2% and 5% by weight.

The catalyst according to the invention comprises a support based on alumina or silica or silica-alumina.

When the support for said catalyst is based on alumina, it contains more than 50% by weight of alumina relative to the total weight of the support and, in general, it contains only alumina or silica-alumina as defined below.

Preferably, the support comprises alumina, and preferably extruded alumina. Preferably, the alumina is gamma alumina.

The alumina support advantageously has a total pore volume of between 0.1 and 1.5 $cm^3.g^{-1}$, preferably between 0.4 and 1.1 $cm^3.g^{-1}$. The total pore volume is measured by mercury porosimetry according to the standard ASTM D4284 with a wetting angle of 140°, as described in the book by Rouquerol F.; Rouquerol J.; Singh K., "Adsorption by Powders & Porous Solids: Principle, methodology and applications", Academic Press, 1999, for example by means of a Micromeritics™ brand Autopore III™ machine.

The specific surface area of the alumina support is advantageously between 5 and 400 $m^2.g^{-1}$, preferably between 10 and 350 $m^2.g^{-1}$, more preferably between 40 and 350 $m^2.g^{-1}$. The specific surface area is determined in the present invention by the BET method according to the standard ASTM D3663, method described in the same book cited above.

In another preferred case, the support for said catalyst is a silica-alumina containing at least 50% by weight of alumina relative to the total weight of the support. The silica content in the support is at most 50% by weight relative to the total weight of the support, usually less than or equal to 45% by weight, preferably less than or equal to 40%.

Sources of silicon are well known to those skilled in the art. Examples that may be mentioned include silicic acid, silica in powder form or in colloidal form (silica sol) and tetraethyl orthosilicate $Si(OEt)_4$.

When the support for said catalyst is based on silica, it contains more than 50% by weight of silica relative to the total weight of the support and, generally, it contains only silica.

According to a particularly preferred variant, the support consists of alumina, silica or silica-alumina.

The support may also advantageously further contain from 0.1% to 50% by weight of zeolite relative to the total weight of the support. In this case, any source of zeolite and any associated preparation method known to those skilled in the art may be incorporated. Preferably, the zeolite is chosen from the group FAU, BEA, ISV, IWR, IWW, MEI, UWY and preferably, the zeolite is chosen from the group FAU and BEA, such as Y and/or beta zeolite.

The support may also contain at least a portion of the VIB and VIII metal(s), and/or at least a portion of the dopant(s) including phosphorus and/or at least a portion of the organic compound(s) containing oxygen (the furan or other compound) and/or nitrogen and/or sulfur which have been introduced independently of the impregnations (for example introduced during the preparation of the support).

The support is advantageously in the form of beads, extrudates, pellets or irregular and nonspherical agglomerates, the specific shape of which may result from a crushing step.

The catalyst according to the invention also comprises a furan compound. The furan compound may be a monofuran or polyfuran compound.

According to one variant, the furan compound is of formula (I)

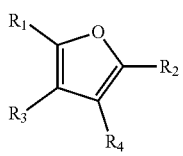

(I)

in which each of the radicals R1, R2, R3 and R4 is chosen from a hydrogen atom, a linear or branched or cyclic hydrocarbon-based radical including from 1 to 20 carbon atoms, a function from among: aldehyde —C(O)H, ketone —C(O)R5, carboxylic acid —COOH, ester —COOR6, hydroxymethyl —CH2OH, alkoxymethyl —CH2OR7, halomethyl —CH2X with X=Cl, Br or I, acyl halide —COX with X=Cl, Br or I, alcohol —OH, ether OR8, thiomethyl —CH2SH, (alkylsulfanyl)methyl —CH2SR9, thioester —COSR10 with R5 to R10 representing a linear or branched or cyclic hydrocarbon-based radical of 1 to 20 carbon atoms, each of said radicals R1, R2, R3, R4, R5, R6, R7, R8, R9 and R10 possibly also including a heteroatom, a halogen and/or at least one function chosen from a hydroxyl function, an aldehyde function, a ketone function, a carboxylic function, an alkanoate function, a thiol function, an alkylsulfanyl function, a thioalkanoate function and an amine function.

Selon une variante, les radicaux R3 et R4 représentent respectivement un atome d'hydrogène.

According to another variant, the furan compound is a polyfuran compound of formula (II)

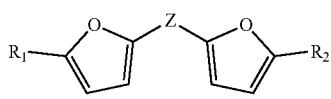

(II)

in which Z is chosen from an oxygen atom, a sulfur atom, a linear or branched or cyclic hydrocarbon-based radical including from 1 to 20 carbon atoms and which may also include a heteroatom, a halogen and/or at least one function chosen from a hydroxyl function, an aldehyde function, a ketone function, a carboxylic function, an alkanoate function, a thiol function, an alkylsulfanyl function, a thioalkanoate function and an amine function, and in which each of the radicals R1 and R2 is chosen from a hydrogen atom, a linear or branched or cyclic hydrocarbon-based radical including from 1 to 20 carbon atoms, a function from among: aldehyde —C(O)H, ketone —C(O)R5, carboxylic acid —COOH, ester —COOR6, hydroxymethyl —CH2OH, alkoxymethyl —CH2OR7, halomethyl —CH2X with X=Cl, Br or I, acyl halide —COX with X=Cl, Br or I, alcohol —OH, ether OR8, thiomethyl —CH2SH, (alkylsulfanyl)methyl —CH2SR9, thioester —COSR10 with R5 to R10 representing a linear or branched or cyclic hydrocarbon-based radical of 1 to 20 carbon atoms, each of said radicals R1, R2, R5, R6, R7, R8, R9 and R10 possibly also including a heteroatom, a halogen and/or at least one function chosen from a hydroxyl function, an aldehyde function, a ketone function, a carboxylic function, an alkanoate function, a thiol function, an alkylsulfanyl function, a thioalkanoate function and an amine function.

The furan compound is preferably chosen from 2-methylfuran (also known as Sylvan), 2,5-dimethylfuran (also known as 2,5-DMF), furfuryl alcohol (also known as furfuranol), 1-(2-furyl)ethanol, 2,5-bis(hydroxymethyl)furan, 5-(hydroxymethyl)furfural (also known as 5-(hydroxymethyl)-2-furaldehyde or 5-HMF), 5-hydroxymethyl-2-furoic acid, 2-methoxyfuran, 2-furaldehyde (also known as furfural), 5-methyl-2-furaldehyde (also known as 5-methylfurfural), 5-(ethoxymethyl)furan-2-carboxaldehyde, 5-acetoxymethyl-2-furaldehyde, 5-chloromethylfurfural, 2,5-diformylfuran, 2-acetylfuran, 2-acetyl-5-methylfuran, furoic acid, 5-ethylfuroic acid, 5-formyl-2-furoic acid, 2,5-furandicarboxylic acid, dimethyl 2,5-f urandicarboxylate, methyl 2-furoate, methyl 5-methyl-2-furoate, furfuryl acetate, furfuryl propionate, furfuryl mercaptan, 2-[(methylsulfanyl)methyl]furan, 2-furanmethanethiol formate, furfuryl thioacetate, furfuryl thiopropionate, methyl 2-thiofuroate, ethyl 3-(furfurylthio)propionate, furfurylamine, 2-furoyl chloride.

When the furan compound is a polyfuran compound of formula (II), it is preferably chosen from bis(5-formylfurfuryl) ether, 2,2'-(thiodimethylene)difuran and 5,5-bis(5-methyl-2-furyl)-2-pentanone (also known as Sylvan trimer).

Preferably, the furan compound is chosen from 2-furaldehyde (also known as furfural), 5-hydroxymethylfurfural (also known as 5-(hydroxymethyl)-2-furaldehyde or 5-HMF), 2-acetylfuran, 5-methyl-2-furaldehyde, methyl 2-furoate, furfuryl alcohol (also known as furfuranol) and furfuryl acetate.

The presence of the furan compound on the catalyst makes it possible to observe increased activity relative to the known catalysts that are not additive-impregnated and the known additive-impregnated dried catalysts. The content of furan compound on the catalyst according to the invention is between 1% and 45% by weight, preferably between 2% and 30% by weight and more preferably between 3% and 25% by weight relative to the total weight of the catalyst. During the preparation of the catalyst requiring a drying step, the drying step(s) consecutive to the introduction of the furan compound are performed at a temperature below 200° C. so as preferably to conserve at least 30%, preferably at least 50% and very preferably at least 70% of the amount of the furan compound introduced, calculated on the basis of the carbon remaining on the catalyst.

The furan compound may be derived from the conventional chemical industry with generally high purities.

The furan compound may also be derived from the processing of biomass, which will be referred to as a biobased furan compound, the product of this processing preferably predominantly containing the furan compound which may or may not be purified before use. Recent studies have shown the feasibility of producing furan compounds from renewable resources such as first-generation or second-generation sugar-yielding biomass such as starch, inulin, sucrose, cellulose or hemicellulose containing sugars such as glucose and fructose. An example that may be mentioned is the furfural production process developed by Shell (WO 2012/041990) which makes it possible, starting with lignocellulosic biomass, to produce a mixture containing at least 50% by weight of furfural. Mention may also be made of the process for producing 5-(hydroxymethyl)furfural developed by Ava Biochem by hydrothermal carbonization of lignocellulosic biomass (WO 2012/119875).

The catalyst according to the invention may comprise, in addition to the furan compound, another organic compound or a group of organic compounds known for their role as additives. The function of the additives is to increase the catalytic activity relative to catalysts without additives. More particularly, the catalyst according to the invention may also comprise one or more oxygen-based organic compounds other than the furan compound and/or one or more nitrogen-based organic compounds and/or one or more sulfur-based organic compounds. Preferably, the catalyst according to the invention may also comprise one or more oxygen-based organic compounds other than the furan compound and/or one or more nitrogen-based organic compounds. Preferably, the organic compound contains at least two carbon atoms and at least one oxygen and/or nitrogen atom.

Generally, the organic compound is chosen from a compound including one or more chemical functions chosen from carboxylic, alcohol, thiol, thioether, sulfone, sulfoxide, ether, aldehyde, ketone, ester, carbonate, amine, nitrile, imide, oxime, urea and amide functions. Preferably, the organic compound is chosen from a compound including two alcohol functions and/or two carboxylic functions and/or two ester functions and/or at least one amide function.

The oxygen-based organic compound may be one or more chosen from compounds including one or more chemical functions chosen from carboxylic, alcohol, ether, aldehyde, ketone, ester and carbonate functions. By way of example, the oxygen-based organic compound may be one or more chosen from the group consisting of ethylene glycol, diethylene glycol, triethylene glycol, a polyethylene glycol (with a molecular weight of between 200 and 1500 g/mol), propylene glycol, 2-butoxyethanol, 2-(2-butoxyethoxy)ethanol, 2-(2-methoxyethoxy)ethanol, triethylene glycol dimethyl ether, glycerol, acetophenone, 2,4-pentanedione, pentanone, acetic acid, maleic acid, malic acid, malonic acid, oxalic acid, gluconic acid, tartaric acid, citric acid, γ-ketovaleric acid, a C1-C4 dialkyl succinate, methyl acetoacetate, ethyl acetoacetate, 2-methoxyethyl 3-oxobutanoate, 2-methacryloyloxyethyl 3-oxobutanoate, dibenzofuran, a crown ether, orthophthalic acid, glucose, γ-valerolactone, 2-acetylbutyrolactone and propylene carbonate.

The nitrogen-based organic compound may be one or more chosen from compounds including one or more chemical functions chosen from amine and nitrile functions. By way of example, the nitrogen-based organic compound may be one or more chosen from the group consisting of ethylenediamine, diethylenetriamine, hexamethylenediamine, triethylenetetramine, tetraethylenepentamine, pentaethylenehexamine, acetonitrile, octylamine, guanidine or a carbazole.

The organic compound containing oxygen and nitrogen may be one or more chosen from compounds including one or more chemical functions chosen from carboxylic, alcohol, ether, aldehyde, ketone, ester, carbonate, amine, nitrile, imide, amide, urea and oxime functions. By way of example, the organic compound containing oxygen and nitrogen may be one or more chosen from the group consisting of 1,2-cyclohexanediaminetetraacetic acid, monoethanolamine (MEA), N-methylpyrrolidone, dimethylformamide, ethylenediaminetetraacetic acid (EDTA), alanine, glycine, nitrilotriacetic acid (NTA), N-(2-hydroxyethyl)ethylenediamine-N,N',N'-triacetic acid (HEDTA), diethylenetriaminepentaacetic acid (DPTA), tetramethylurea, glutamic acid, dimethylglyoxime, bicine and tricine, or else a lactam.

The sulfur-based organic compound may be one or more chosen from compounds including one or more chemical functions chosen from thiol, thioether, sulfone and sulfoxide functions. By way of example, the sulfur-based organic compound may be one or more chosen from the group consisting of thioglycolic acid, 2-hydroxy-4-methylthiobutanoic acid, a sulfone derivative of a benzothiophene or a sulfoxide derivative of a benzothiophene.

Preferably, the oxygen-based organic compound is preferably chosen from γ-valerolactone, 2-acetylbutyrolactone, triethylene glycol, diethylene glycol, ethylene glycol, ethylenediaminetetraacetic acid (EDTA), maleic acid, malonic acid, citric acid, γ-ketovaleric acid, dimethylformamide, N-methylpyrrolidone, propylene carbonate, 2-methoxyethyl 3-oxobutanoate, 2-methacryloyloxyethyl 3-oxobutanoate, bicine and tricine.

When it is/they are present, the content of additive-impregnated functionalized organic compound(s) containing oxygen (other than the furan compound) and/or nitrogen and/or sulfur on the catalyst according to the invention is between 1% and 30% by weight, preferably between 1.5% and 25% by weight and more preferably between 2% and 20% by weight relative to the total weight of the catalyst.

Preparation Process

The catalyst according to the invention may be prepared according to any method for preparing a supported catalyst that is additive-impregnated with an organic compound known to those skilled in the art.

According to a first variant, the catalyst according to the invention may be prepared by performing a step of impregnating with said furan compound, advantageously by means of a solution containing a solvent in which the furan compound is diluted. According to this variant, the process for preparing said catalyst involves a step of adding said furan compound via the liquid phase. After impregnation, a drying step is then necessary to remove the solvent and/or the excess furan compound and thus free the porosity needed for the use of the catalyst.

According to a second and third variants, the catalyst according to the invention may be prepared by performing a step of adding said furan compound via the gaseous phase. These variants are described hereinbelow.

Introduction of the Fran Cmpound Via the Liquid Phase

According to the first variant, the catalyst according to the invention may be prepared according to a preparation process comprising the following steps:

a) a compound including a Group VIB element, at least one compound including a Group VIII element, furan compound and optionally phosphorus are placed in contact with a support based on alumina or silica or silica-alumina, or a regenerated catalyst containing a support based on alumina or silica or silica-alumina, at least one Group VIB element, at least one Group VIII element and optionally phosphorus are placed in contact with a furan compound, so as to obtain a catalyst precursor, b) said catalyst precursor derived from step a) is dried at a temperature below 200° C., without subsequently calcining it.

According to this variant, the process for preparing a fresh catalyst will be described first, and the process for preparing a rejuvenated catalyst will then be described thereafter.

I) Process for Preparing a Fresh Catalyst

Step a) of placing in contact includes several embodiments which differ notably by the moment of introduction of the furan compound, which may be performed either at the same time as the impregnation of the metals (co-impregnation) or after the impregnation of the metals (post-impregnation), or, finally, before the impregnation of the metals (pre-impregnation). Furthermore, the step of placing in contact may combine at least two embodiments, for example co-impregnation and post-impregnation. These various embodiments will be described hereinbelow. Each embodiment, taken alone or in combination, may proceed in one or more steps.

It is important to point out that the catalyst according to the invention, during its preparation process, does not undergo any calcination after the introduction of the furan compound or of any other organic compound containing oxygen and/or nitrogen and/or sulfur, so as to at least partly preserve the furan compound or any other organic compound in the catalyst. The term "calcination" means herein a thermal treatment under a gas containing air or oxygen at a temperature of greater than or equal to 200° C.

However, the catalyst precursor may undergo a calcination step before the introduction of the furan compound or of any other organic compound containing oxygen and/or nitrogen and/or sulfur, notably after the impregnation of the Group VIB and VIII elements (post-impregnation) optionally in the presence of phosphorus and/or of another dopant or during regeneration of an already-used catalyst. The hydrogenating function comprising the Group VIB and Group VIII elements of the catalyst according to the invention, also known as the active phase, is then in an oxide form.

According to another variant, the catalyst precursor does not undergo any calcination step after the impregnation of the Group VIB and VIII elements (post-impregnation), it is simply dried. The hydrogenating function comprising the Group VIB and Group VIII elements of the catalyst according to the invention, also known as the active phase, is then not in an oxide form.

Irrespective of the embodiment, step a) of placing in contact generally involves at least one impregnation step, preferably a dry impregnation step, in which the support is impregnated with an impregnation solution comprising at least one Group VIB element, at least one Group VIII element and optionally phosphorus. In the case of the co-impregnation described below in detail, this impregnation solution also comprises at least one furan compound. The Group VIB and Group VIII elements are generally introduced by impregnation, preferentially by dry impregnation or by impregnation in an excess of solution. Preferably, the total amount of the Group VIB and Group VIII elements is introduced by impregnation, preferably by dry impregnation, irrespective of the embodiment.

The Group VIB and Group VIII elements may also be partly introduced during the forming of said support at the moment of blending with at least one alumina gel chosen as matrix, the rest of the hydrogenating elements then being introduced subsequently by impregnation. Preferably, when the Group VIB and Group VIII elements are partly introduced at the moment of blending, the proportion of Group VIB element introduced during this step is less than 5% by weight of the total amount of Group VIB element introduced onto the final catalyst.

Preferably, the Group VIB element is introduced at the same time as the Group VIII element, irrespective of the introduction method.

The molybdenum precursors that may be used are well known to those skilled in the art. For example, among the sources of molybdenum, use may be made of oxides and hydroxides, molybdic acids and salts thereof, in particular the ammonium salts such as ammonium molybdate, ammonium heptmolybdate, phosphomolybdic acid ($H_3PMo_{12}O_{40}$) and salts thereof, and optionally silicomolybdic acid ($H_4SiMo_{12}O_{40}$) and salts thereof. The sources of molybdenum may also be heteropolycompounds of Keggin, lacunar Keggin, substituted Keggin, Dawson, Anderson or Strandberg type, for example. Molybdenum trioxide and heteropolyanions of Keggin, lacunar Keggin or substituted Keggin type are preferably used.

The tungsten precursors that may be used are also well known to those skilled in the art. For example, among the sources of tungsten, use may be made of oxides and hydroxides, tungstic acids and salts thereof, in particular the ammonium salts such as ammonium tungstate, ammonium metatungstate, phosphotungstic acid and salts thereof, and optionally silicotungstic acid ($H_4SiW_{12}O_{40}$) and salts thereof. The sources of tungsten may also be heteropolycompounds of Keggin, lacunar Keggin, substituted Keggin or Dawson type, for example. Oxides and ammonium salts such as ammonium metatungstate or heteropolyanions of Keggin, lacunar Keggin or substituted Keggin type are preferably used.

The precursors of the Group VIII elements that may be used are advantageously chosen from oxides, hydroxides, hydroxycarbonates, carbonates and nitrates of Group VIII elements. For example, nickel hydroxycarbonate or cobalt carbonate or hydroxide are preferably used.

Phosphorus, when it is present, may be totally or partially introduced by impregnation. Preferably, it is introduced by impregnation, preferably dry impregnation, by means of a solution containing the precursors of the Group VIB and Group VIII elements.

Said phosphorous may be advantageously introduced alone or as a mixture with at least one of the Group VIB and Group VIII elements, and this may be done in any of the steps of impregnation of the hydrogenating function if said function is introduced in several portions. Said phosphorous may also be introduced, totally or partially, during the impregnation of the furan compound if the latter is introduced separately of the hydrogenating function (in the post-impregnation and pre-impregnation cases described later) and this may be done in the presence or absence of an organic compound other than the furan compound containing oxygen and/or nitrogen and/or sulfur. It may also be introduced at the stage of synthesis of the support, at any step in the synthesis thereof. It may thus be introduced before, during or after the blending of the chosen alumina gel matrix, for instance and preferably aluminum oxyhydroxide (boehmite) which is the alumina precursor.

The preferred phosphorus precursor is orthophosphoric acid $H_3PO_4$, but salts and esters thereof such as ammonium phosphates are also suitable for use. The phosphorus may also be introduced at the same time as the Group VIB element(s) in the form of Keggin, lacunar Keggin, substituted Keggin or Strandberg heteropolyanions.

The furan compound is advantageously introduced into an impregnation solution which, depending on the preparation method, may be the same solution as or a different solution from the one containing the Group VIB and VIII elements, in a total amount corresponding to:
  a mole ratio of the furan compound to the Group VIB element(s) of the catalyst precursor of between 0.01 to 5 mol/mol, preferably between 0.05 to 3 mol/mol, preferably between 0.1 and 1.5 mol/mol and very preferably between 0.2 and 1 mol/mol, calculated on the basis of the components introduced into the impregnation solution(s), and a mole ratio of the furan compound to the Group VIII element(s) of the catalyst precursor of between 0.02 to 17 mol/mol, preferably between 0.1 to 10 mol/mol, preferably between 0.2 and 5 mol/mol and very preferably between 0.4 and 3.5 mol/mol, calculated on the basis of the components introduced into the impregnation solution(s).

Any impregnation solution described in the present invention may comprise any polar solvent known to those skilled in the art. Said polar solvent used is advantageously chosen from the group formed by methanol, ethanol, water, phenol and cyclohexanol, taken alone or as a mixture. Said polar solvent may also be advantageously chosen from the group formed by propylene carbonate, DMSO (dimethyl sulfoxide), N-methylpyrrolidone (NMP) and sulfolane, taken alone or as a mixture. Preferably, a polar protic solvent is used. A list of common polar solvents and also their dielectric constant can be found in the book "Solvents and Solvent Effects in Organic Chemistry" C. Reichardt, Wiley-VCH, 3rd edition, 2003, pages 472-474. Very preferably, the solvent used is water or ethanol, and particularly preferably, the solvent is water. In one possible embodiment, the solvent may be absent from the impregnation solution, notably during a pre-impregnation or post-impregnation preparation.

When the catalyst also comprises a dopant chosen from boron, fluorine or a mixture of boron and fluorine, the introduction of this (these) dopant(s) may be performed in the same manner as the introduction of phosphorus described above in various steps of the preparation and in various ways.

Said dopant, when there is one, is advantageously introduced as a mixture with the precursor(s) of the Group VIB and Group VIII elements, totally or partially on the formed support, by dry impregnation of said support using a solution, preferably an aqueous solution, containing the metal precursors, the phosphorus precursor and the precursor(s) of the dopant(s) (and also containing the furan compound in the co-impregnation mode).

The boron precursors may be boric acid, orthoboric acid $H_3BO_3$, ammonium diborate or pentaborate, boron oxide or boric esters. The boron may be introduced, for example, by a solution of boric acid in a water/alcohol mixture or in a water/ethanolamine mixture. Preferably, the boron precursor, if boron is introduced, is orthoboric acid.

The fluorine precursors that may be used are well known to those skilled in the art. For example, the fluoride anions may be introduced in the form of hydrofluoric acid or salts thereof. These salts are formed with alkali metals, ammonium or an organic compound. In the latter case, the salt is advantageously formed in the reaction mixture by reaction between the organic compound and hydrofluoric acid. The fluorine may be introduced, for example, by impregnation of an aqueous solution of hydrofluoric acid, or of ammonium fluoride or of ammonium difluoride.

When the catalyst also comprises an additional additive (in addition to the furan compound) or a group of additional additives chosen from an organic compound other than the furan compound containing oxygen and/or nitrogen and/or sulfur, it may be introduced into the impregnation solution of step a).

The mole ratio of organic compound(s) containing oxygen and/or nitrogen and/or sulfur to the Group VIB element(s) on the catalyst is between 0.05 and 5 mol/mol, preferably between 0.1 and 4 mol/mol, preferably between 0.2 and 3 mol/mol, calculated on the basis of the components introduced into the impregnation solution(s).

The mole ratio of organic compound(s) containing oxygen and/or nitrogen and/or sulfur to the furan compound is between 0.05 and 5 mol/mol, preferably between 0.1 and 4 mol/mol, preferably between 0.2 and 3 mol/mol, calculated on the basis of the components introduced into the impregnation solution(s).

Advantageously, after each impregnation step, the impregnated support is left to mature. Maturation allows the impregnation solution to become homogeneously dispersed within the support.

Any maturation step described in the present invention is advantageously performed at atmospheric pressure, in a water-saturated atmosphere and at a temperature of between 17° C. and 50° C., and preferably at room temperature. Generally, a maturation time of between ten minutes and forty-eight hours, and preferably of between thirty minutes and five hours, is sufficient. Longer periods of time are not ruled out, but do not necessarily afford any improvement.

In accordance with step b) of the preparation process according to the invention, the optionally matured catalyst precursor obtained in step a) is subjected to a step of drying at a temperature below 200° C. without a subsequent calcination step.

Any drying step subsequent to the introduction of the furan compound described in the present invention is performed at a temperature below 200° C., preferably between 50 and 180° C., preferably between 70 and 150° C. and very preferably between 75 and 130° C.

The drying step is advantageously performed via any technique known to those skilled in the art. It is advantageously performed at atmospheric pressure or at reduced pressure. Preferably, this step is performed at atmospheric pressure. It is advantageously performed in a crossed bed using hot air or any other hot gas. Preferably, when the drying is performed in a fixed bed, the gas used is either air, or an inert gas such as argon or nitrogen. Very preferably, the drying is performed in a crossed bed in the presence of nitrogen and/or air. Preferably, the drying step has a short duration of between 5 minutes and 4 hours, preferably between 30 minutes and 4 hours and very preferably between 1 hour and 3 hours. The drying is then conducted so as preferentially to keep at least 30% of the furan compound introduced during an impregnation step; preferably, this amount is greater than 50% and even more preferably greater than 70%, calculated on the basis of the carbon remaining on the catalyst. When an organic compound other than the furan compound containing oxygen and/or nitrogen and/or sulfur is present, the drying step is performed so as preferably to keep at least 30%, preferably at least 50%, and very preferably at least 70% of the amount introduced, calculated on the basis of carbon remaining on the catalyst.

On conclusion of the drying step b), a dried catalyst is obtained, which is not subjected to any subsequent calcination step.

Co-Impregnation

According to a first embodiment of step a) of the process for preparing the (fresh) catalyst, said compounds comprising the Group VIB and Group VIII elements, the furan compound and optionally phosphorus are deposited on said support, via one or more co-impregnation steps, i.e. said compounds comprising the Group VIB and Group VIII elements, the furan compound and optionally phosphorus are introduced simultaneously into said support ("co-impregnation"). According to one variant, step a) is the following step:

a') a support based on alumina or silica or silica-alumina is impregnated with at least one solution containing at least one compound including a Group VIB element, at least one compound including a Group VIII element, the furan compound and optionally phosphorus so as to obtain a catalyst precursor.

The co-impregnation step(s) are preferentially performed by dry impregnation or by impregnation in an excess of solution. When this first mode comprises the implementation of several co-impregnation steps, each co-impregnation step is preferably followed by an intermediate drying step at a temperature below 200° C., advantageously between 50 and 180° C., preferably between 70 and 150° C., very preferably between 75 and 130° C. and optionally a maturation period was observed between impregnation and drying.

Very preferably, during the preparation via co-impregnation, the Group VIB and Group VIII elements, the furan compound, optionally phosphorus, optionally another dopant chosen from boron and/or fluorine and optionally an organic compound other than the furan compound containing oxygen and/or nitrogen and/or sulfur are totally introduced in step a) after forming said support, by dry impregnation of said support using an aqueous impregnation solution containing the precursors of the Group VIB and Group VIII elements, the furan compound, optionally the phosphorus precursor, optionally the precursor of the dopant chosen from boron and/or fluorine and optionally the organic compound other than the furan compound containing oxygen and/or nitrogen and/or sulfur.

Post-Impregnation

According to a second embodiment of step a) of the process for preparing the (fresh) catalyst according to the invention, at least one furan compound is placed in contact with a dried and optionally calcined impregnated support comprising at least one Group VIB element, at least one Group VIII element and optionally phosphorus, said support being based on alumina or silica or silica-alumina, so as to obtain a catalyst precursor.

This second embodiment is a "post-impregnation" preparation of the furan compound. This post-impregnation is performed, for example, by dry impregnation.

According to this second embodiment, the placing in contact in step a) comprises the following successive steps which will be detailed hereinbelow:

a1) a support based on alumina or silica or silica-alumina is impregnated with at least one solution containing at least one compound including a Group VIB element, at least one compound including a Group VIII element and optionally phosphorus to obtain an impregnated support, a2) the impregnated support obtained in step a1) is dried at a temperature below 200° C. to obtain a dried impregnated support, and the dried impregnated support is optionally calcined to obtain a calcined impregnated support, a3) the dried and optionally calcined impregnated support obtained in step a2) is impregnated with an impregnation solution comprising at least the furan compound so as to obtain a catalyst precursor, a4) optionally, the catalyst precursor obtained in step a3) is left to mature.

In step a1) of the post-impregnation implementation, the introduction of the Group VIB and Group VIII elements and optionally of phosphorus onto the support may be advantageously performed via one or more impregnations with an excess of solution on the support, or preferably via one or more dry impregnations, and, preferably, via only one dry impregnation of said support, using solution(s), preferably aqueous solution(s), containing the metal precursor(s) and preferably the phosphorus precursor.

When several impregnation steps are performed, each impregnation step is preferably followed by an intermediate drying step at a temperature below 200° C., advantageously between 50 and 180° C., preferably between 70 and 150° C., very preferably between 75 and 130° C. and optionally a maturation period was observed between impregnation and drying. Each intermediate drying step, prior to the introduction of the furan compound, may be followed by a step of calcination under the conditions described below for step a2).

Very preferably, during the preparation via post-impregnation, the Group VIB and Group VIII elements and optionally phosphorus, optionally another dopant chosen from boron and/or fluorine and optionally an organic compound other than the furan compound containing oxygen and/or nitrogen and/or sulfur are totally introduced in step a1) after forming said support, by dry impregnation of said support using an aqueous impregnation solution containing the precursors of the Group VIB and Group VIII elements, the phosphorus precursor and optionally the precursor of the dopant chosen from boron and/or fluorine and optionally the organic compound other than the furan compound containing oxygen and/or nitrogen and/or sulfur.

According to another variant, the Group VIB and Group VIII elements and optionally phosphorus, optionally another dopant chosen from boron and/or fluorine and optionally an organic compound other than the furan compound containing oxygen and/or nitrogen and/or sulfur may be introduced successively in step a1) via several impregnation solutions containing one or more of the components.

Advantageously, the impregnated support obtained in step a1) is left to mature under the conditions described for the above maturation.

In step a2), the impregnated support obtained in step a1) is dried at a temperature below 200° C. to obtain an impregnated support dried under the conditions described for the above drying.

Optionally, the dried impregnated support may then undergo calcination. The calcination is generally performed at a temperature of between 200° C. and 900° C., preferably between 250° C. and 750° C. The calcination time is generally between 30 minutes and 16 hours, preferably between 1 hour and 5 hours. It is generally performed in air. Calcination enables the precursors of the Group VIB and VIII metals to be converted into oxides.

In step a3), the dried impregnated support obtained in step a2) is impregnated with an impregnation solution comprising at least the furan compound so as to obtain a catalyst precursor.

The furan compound may advantageously be deposited in one or more steps either by impregnation in excess, or by dry impregnation, or by any other means known to those skilled in the art. Preferably, the furan compound is introduced by dry impregnation, in the presence or absence of a solvent as described above.

Preferably, the solvent in the impregnation solution used in step a3) is water, which facilitates the implementation at the industrial scale.

The furan compound is advantageously introduced into the impregnation solution of step a3) with the mole ratios per Group VIB or Group VIII element described above.

When it is desired also to introduce an additional additive (in addition to the furan compound) or a group of additional additives chosen from an organic compound containing oxygen and/or nitrogen and/or sulfur, said additional additive may be introduced into the impregnation solution of step a1) and/or into the impregnation solution of step a3) or else via an additional impregnation step at any point in the preparation process before the final drying of step b), it being understood that no calcination step is performed after its introduction. This compound is introduced in the proportions described above.

In step a4), the catalyst precursor obtained in step a3) is optionally left to mature, this being done under the maturation conditions described above.

In accordance with step b) of the preparation process according to the invention, the catalyst precursor which has optionally been matured in step a4) is subjected to a step of drying at a temperature below 200° C. without a subsequent calcination step, as described above.

Pre-Impregnation

According to a third embodiment of step a) of the process for preparing the (fresh) catalyst according to the invention, at least one compound including a Group VIB element, at least one compound including a Group VIII element, and optionally phosphorus are placed in contact with the support based on alumina or silica or silica-alumina which contains a furan compound so as to obtain a catalyst precursor.

This third embodiment is a "pre-impregnation" preparation of the furan compound. This pre-impregnation is performed, for example, by dry impregnation.

According to this third embodiment, the placing in contact in step a) comprises the following successive steps which will be detailed hereinbelow:

a1') a support comprising at least one furan compound and optionally at least a portion of the phosphorus is prepared, a2') the support obtained in step a1') is impregnated with an impregnation solution comprising at least one compound including a Group VIB element, at least one compound including a Group VIII element and optionally phosphorus so as to obtain a catalyst precursor, a3') optionally, the catalyst precursor obtained in step a2') is left to mature.

In step a1') of the implementation by pre-impregnation, a support comprising at least one furan compound and optionally at least a portion of the phosphorus is prepared. The furan compound may be introduced at any moment in the preparation of the support, and preferentially during the forming or by impregnation on an already-formed support.

If introduction of the furan compound onto the preformed support is chosen, then this introduction may be performed as is indicated for the post-impregnation step a3). It will then be followed by an optional maturation step and drying at a temperature below 200° C. under the maturation and drying conditions as described above.

If introduction during the forming is chosen, preferably, said forming is performed by extrusion blending, by pelletizing, by the drop coagulation (oil-drop) method, by spinning-plate granulation or via any other method that is well known to those skilled in the art. Very preferably, said forming is performed by extrusion blending, the furan compound being able to be introduced at any moment in the extrusion blending. The formed material obtained on conclusion of the forming step then advantageously undergoes a step of heat treatment at a temperature such that at least a portion of the furan compound remains present, preferably at a temperature below 200° C.

This is likewise the case for the phosphorus that is optionally present in said support from step a1'). The phosphorus may be introduced at any moment in the preparation of the support, and preferentially during the forming or by impregnation on an already-formed support as described above. If the phosphorus is introduced alone during the forming, i.e. without the furan compound, which is itself then introduced by impregnation, the calcination temperature following its introduction may then advantageously be performed at a temperature below 1000° C.

In step a2') of the post-impregnation implementation, the introduction of the Group VIB and Group VIII elements and optionally of phosphorus may be advantageously performed via one or more impregnations with an excess of solution on the support, or preferably via one or more dry impregnations, and, preferably, via only one dry impregnation of said support, using solution(s), preferably aqueous solution(s), containing the metal precursor(s) and optionally the phosphorus precursor.

Advantageously, the catalyst precursor obtained in step a2') is left to mature under the maturation conditions described above.

When it is desired also to introduce an additional additive (in addition to the furan compound) or a group of additional additives chosen from an organic compound containing oxygen and/or nitrogen and/or sulfur, said additional additive may be introduced into the support of step a1') during the forming or by impregnation, and/or into the impregnation solution of step a2') or else via an additional impregnation step at any point in the preparation process before the final drying of step b), it being understood that no calcination step is performed after its introduction.

The three modes described above may be performed alone as described or mixed to give rise to other hybrid preparation modes as a function of the technical and practical constraints.

According to another alternative embodiment, the placing in contact in step a) combines at least two modes of placing in contact, for example the co-impregnation of an organic compound and the post-impregnation of an organic compound which may be identical to or different from the one used for the co-impregnation, given that at least one of the organic compounds is a furan compound.

According to this alternative embodiment, the placing in contact in step a) comprises the following successive steps:

a1") a solution containing at least one compound including a Group VIB element, at least one compound including a Group VIII element, at least one organic compound containing oxygen and/or nitrogen and/or sulfur, and optionally phosphorus are placed in contact by co-impregnation with a support based on alumina or silica or silica-alumina so as to obtain an impregnated support, a2") the impregnated support derived from step a1") is dried at a temperature below 200° C., without subsequently calcining it, to obtain a dried impregnated support, a3")the dried impregnated support derived from step a2") is placed in contact with a solution of at least one organic compound containing oxygen and/or nitrogen and/or sulfur which is identical to or different from the one used in step a1") so as to obtain a catalyst precursor, a4") optionally, the catalyst precursor obtained in step a3") is left to mature, and at least one of the organic compounds of step a1") or of step a3") is a furan compound.

The operating conditions described above are, needless to say, applicable in the context of this last embodiment.

II) Process for Preparing a Rejuvenated Catalyst

The catalyst according to the invention may be a rejuvenated catalyst. When the furan compound is introduced via the liquid phase and thus via an impregnation step, this catalyst may be prepared according to the preparation process comprising the following steps:
- a) a regenerated catalyst containing a support based on alumina or silica or silica-alumina, at least one Group VIB element, at least one Group VIII element and optionally phosphorus is placed in contact with a furan compound so as to obtain a catalyst precursor,
- b) said catalyst precursor derived from step a) is dried at a temperature below 200° C., without subsequently calcining it.

In step a), a regenerated catalyst is placed in contact with a furan compound so as to obtain a catalyst precursor. The regenerated catalyst is a catalyst which has been used as catalyst in a catalytic unit and notably in hydrotreating and/or hydrocracking and which has been subjected to at least one step of partial or total removal of coke, for example by calcination (regeneration). The regeneration may be performed via any means known to those skilled in the art. The regeneration is generally performed by calcination at temperatures of between 350 and 550° C., and usually between 400 and 520° C., or between 420 and 520° C., or between 450 and 520° C., temperatures below 500° C. often being advantageous.

The regenerated catalyst contains a support based on alumina or silica or silica-alumina, at least one Group VIB element, at least one Group VIII element and optionally phosphorus in the respective proportions indicated above. Following the regeneration, the hydrogenating function comprising the Group VIB and Group VIII elements of the regenerated catalyst is in an oxide form. It may also contain dopants other than phosphorus, as described above.

According to this embodiment, the placing in contact in step a) comprises the following successive steps:
- a1''') a regenerated catalyst containing a support based on alumina or silica or silica-alumina, at least one Group VIB element, at least one Group VIII element and optionally phosphorus is impregnated with an impregnation solution comprising at least one furan compound so as to obtain a catalyst precursor,
- a2''') optionally, the catalyst precursor obtained in step a1''') is left to mature.

Preferably, the placing in contact of step a) is performed by impregnation of the regenerated catalyst with an impregnation solution comprising at least one furan compound so as to obtain a catalyst precursor.

The furan compound may advantageously be deposited in one or more steps either by impregnation in excess, or by dry impregnation, or by any other means known to those skilled in the art. Preferably, the furan compound is introduced by dry impregnation, in the presence or absence of a solvent as described above.

Preferably, the solvent in the impregnation solution used is water, which facilitates the implementation at the industrial scale.

The furan compound is advantageously introduced into the impregnation solution with the mole ratios per Group VIB or Group VIII element described above.

When it is desired also to introduce an additional additive (in addition to the furan compound) or a group of additional additives chosen from an organic compound containing oxygen and/or nitrogen and/or sulfur, said additional additive may be introduced into the impregnation solution of step a1''') or via an additional impregnation step at any point in the preparation process before the final drying of step b), it being understood that no calcination step is performed after its introduction. This compound is introduced in the proportions described above.

In step a2'''), the catalyst precursor obtained in step a1''') is optionally left to mature, this being done under the maturation conditions described above.

In accordance with step b) of the preparation process according to the invention, the catalyst precursor which has optionally been matured in step a2''') is subjected to a step of drying at a temperature below 200° C. without a subsequent calcination step, as described above.

Introduction of the Furan Compound Via the Gaseous Phase

According to a second and third variants, the fresh catalyst according to the invention may be prepared by performing a step of addition of said furan compound via the gaseous phase as described in the French patent applications filed under the national numbers 17/53.921 and 17/53.922. According to these variants, the process for preparing said catalyst does not involve a conventional step of impregnation of said furan compound. Consequently, it is not necessary to perform a drying step after introduction of the furan compound.

According to the second variant, the process for preparing the catalyst according to the invention comprises the following steps:
- i) the furan compound is deposited on a support based on alumina or silica or silica-alumina by performing a step in which said support and the furan compound in liquid form are brought together simultaneously and without any physical contact between the support and the furan compound in liquid form, at a temperature below the boiling point of the furan compound and under pressure and time conditions such that a fraction of said furan compound is transferred in gaseous form to the support,
- ii) at least one compound including a Group VIB element, at least one compound including a Group VIII element, and optionally phosphorus are placed in contact with the support based on alumina or silica or silica-alumina,
- iii) the solid obtained on conclusion of step ii) is dried, step i) being performed before or after steps ii) and iii) or during step iii).

This second variant is characterized in that the addition of the furan compound to the support is performed without physical contact with the furan compound in liquid form, i.e. without impregnation of the support with the liquid. The process is based on the principle of the existence of a vapor pressure of the furan compound which is generated by its liquid phase at a given temperature and a given pressure. Thus, a portion of the molecules of furan compound in liquid form passes into the gaseous form (vaporization) and is then transferred (gaseously) to the support. This bringing-together step i) is performed for a time that is sufficient to attain the target content of furan compound in the support.

Generally, step i) is performed at an absolute pressure of between 0 and 1 MPa. Preferably, the operating temperature of step i) is below 200° C., preferably between 10° C. and 150° C., more preferably between 25° C. and 120° C.

According to the third variant, the process for preparing the catalyst according to the invention comprises the following steps:
- i') the furan compound is deposited onto a support based on alumina or silica or silica-alumina by performing a step in which the support is brought together, in a closed or open chamber, with a porous solid containing a furan compound, this step being performed under temperature, pressure and time conditions such that a fraction of said furan compound is transferred gaseously from the porous solid to the support, ii) at least one compound including a Group VIB element, at least one compound including a Group VIII element, and optionally phosphorus are placed in contact with the support based on alumina or silica or silica-alumina, iii) the solid obtained on conclusion of step ii) is dried, step i') being performed separately before or after steps ii) and iii).

According to this third variant, the addition of the furan compound consists in bringing together, in an open or closed chamber, a first batch of porous solid rich in a furan compound which has been previously deposited in liquid form onto said solid with a support (second batch of porous solid low in said furan compound). The object of this bringing together of the porous solids is to enable a gaseous transfer of a portion of the furan compound contained in the first batch of porous solid to the second batch of porous solid. According to the invention, the term "low in furan compound" notably covers the case where the second batch of porous solid is free of said furan compound.

This third variant is based on the principle of the existence of a vapor pressure of the furan compound at a given temperature and a given pressure. Thus, a portion of the molecules of furan compound of the batch of porous solid rich in furan compound passes into gaseous form (vaporization) and is then transferred (gaseously) to the support (solid low in furan compound). According to the invention, the porous solid rich in furan compound acts as a source of furan compound for enriching with furan compound the support (porous solid low in furan compound).

The porous solid rich in furan compound is advantageously a porous support, preferably a support based on alumina or silica or silica-alumina, which may contain a Group VIB element, at least one Group VIII element and optionally phosphorus.

The (first batch of solid rich in furan compound)/(support or second batch of solid low in furan compound) mass ratio depends on the pore distribution of the solids and on the objective in terms of targeted amount of furan compound on the solids derived from the bringing-together step a). This mass ratio is generally less than or equal to 10, preferably less than 2 and even more preferably between 0.05 and 1, limits included.

The step of bringing together the batches of porous solids is preferably performed under controlled temperature and pressure conditions and so that the temperature is below the boiling point of said furan compound to be transferred gaseously. Preferably, the operating temperature is below 150° C. and the absolute pressure is generally between 0 and 1 MPa, preferably between 0 and 0.5 MPa and more preferably between 0 and 0.2 MPa. It will thus be possible to perform the bringing-together step in an open or closed chamber, optionally with control of the composition of the gas present in the chamber.

When the step of bringing together the porous solids takes place in an open chamber, it will be ensured that the entrainment of the furan compound out of the chamber is limited as much as possible. Alternatively, the step of bringing together the porous solids may be performed in a closed chamber, for example in a container for storing or transporting the solid that is impermeable to gas exchanges with the external environment.

The term "bringing together" denotes the fact that the solids are present at the same time in the chamber without there necessarily being any physical contact of the two batches of solids.

The term "rich in furan compound" reflects the fact that the solid contains more than 50% of the total amount of said furan compound used in step i), preferably at least 60%, preferably at least 80%, preferably at least 90% and preferably 100%. According to one embodiment, the porous solid rich in furan compound contains 100% of the total amount used in step i) and the support (second batch of solid low in furan compound) therefore contains 0% of the total amount of said furan compound.

The two variants for preparation of the (fresh) catalyst via the gaseous phase (second and third variants) may be performed according to two embodiments A) and B).

According to a first embodiment A), the porous support is subjected to a step of impregnation with a solution comprising a compound including a Group VIB element, a compound including a Group VIII element and optionally phosphorus, so as to deposit an active metal phase (step ii). The support impregnated with the active metal phase is optionally subjected to a maturation step and is then dried (step iii) in order to remove the solvent introduced in step ii). The dried support containing the active metal phase and optionally phosphorus is treated in step i) or i') of bringing together with a furan compound in liquid form or a porous solid containing a furan compound so as to provide a catalyst that is additive-impregnated with said furan compound.

According to another embodiment B) for preparing the catalyst according to the invention, a catalyst support that does not contain an active phase is used. The support is firstly subjected to a step of adding the furan compound so as to provide a catalyst support additive-impregnated with the organic compound (step i) or i')), which, after an optional maturation phase, is sent to the step of impregnation of the active phase (step ii). This step may consist in placing the additive-impregnated support in contact with a solution containing at least one compound including a Group VIB element, at least one compound including a Group VIII element and optionally phosphorus. The additive-impregnated catalyst thus obtained is optionally left to mature and then subjected to a drying step (step iii) with a view to removing the solvent introduced during the step of impregnation of the metal precursors of the active phase.

In the two embodiments A) and B), the porous support may notably already contain an additional organic compound other than the furan compound.

It should be noted that, irrespective of the embodiments A) and B), step ii) of depositing the active metal phase may use a solution containing at least one compound including a Group VIB element, at least one compound including a Group VIII element, and optionally phosphorus, and also one or more additional organic compounds other than that of step i) or i').

According to a fourth and fifth variants, the step of adding said furan compound via the gaseous phase may also be performed on a regenerated catalyst.

According to these fourth and fifth variants, the process for preparing the catalyst according to the invention comprises the following step:

i") the furan compound is deposited on a regenerated catalyst containing a support based on alumina or silica or silica-alumina, at least one Group VIB element, at least one Group VIII element and optionally phosphorus, by performing a step in which said regenerated catalyst and the furan compound in liquid form are brought together simultaneously and without any physical contact between the catalyst and the furan compound in liquid form, at a temperature below the boiling point of the furan compound and under pressure and time conditions such that a fraction of said furan compound is transferred in gaseous form to the catalyst, or i''') the furan compound is deposited onto a regenerated catalyst containing a support based on alumina or silica or silica-alumina, at least one Group VIB element, at least one Group VIII element and optionally phosphorus, by performing a step in which the catalyst is brought together, in a closed or open chamber, with a porous solid containing a furan compound, this step being performed under temperature, pressure and time conditions such that a fraction of said furan compound is transferred gaseously from the porous solid to the catalyst.

The fresh or rejuvenated additive-impregnated catalyst obtained by introduction of the furan compound in the gaseous phase as described above may also be treated with one or more subsequent steps in order to incorporate one or more other additional organic compounds different from the one used in step i), i'), i'') or i'''). The incorporation of one or more other additional different organic compounds may be performed by means of gaseous-phase addition processes or according to any other method known to those skilled in the art, for instance by impregnation of a solution containing the additional organic compound.

Sulfurization

Before its use for the hydrotreating and/or hydrocracking reaction, it is advantageous to transform the catalyst obtained according to one of the modes of introduction described in the present invention into a sulfurized catalyst in order to form its active species. This activation or sulfurization step is performed via the methods that are well known to those skilled in the art, and advantageously under a sulfo-reductive atmosphere in the presence of hydrogen and hydrogen sulfide.

On conclusion of step b) according to the various modes of preparation of the process according to the invention, said catalyst obtained is thus advantageously subjected to a sulfurization step, without an intermediate calcination step.

Said dried catalyst is advantageously sulfurized ex situ or in situ. The sulfurizing agents are $H_2S$ gas or any other sulfur-based compound used for the activation of hydrocarbon feedstocks for the purpose of sulfurizing the catalyst. Said sulfur-based compounds are advantageously chosen from alkyl disulfides, for instance dimethyl disulfide (DMDS), alkyl sulfides, for instance dimethyl sulfide, thiols, for instance n-butyl mercaptan (or 1-butanethiol), polysulfides of tert-nonyl polysulfide type, or any other compound known to those skilled in the art for obtaining good sulfurization of the catalyst. Preferably, the catalyst is sulfurized in situ in the presence of a sulfurizing agent and of a hydrocarbon-based feedstock. Very preferably, the catalyst is sulfurized in situ in the presence of a hydrocarbon-based feedstock additive-impregnated with dimethyl disulfide.

Hydrotreating and/or Hydrocracking Process

Finally, another subject of the invention is the use of the catalyst according to the invention or prepared according to the preparation process according to the invention in processes for the hydrotreating and/or hydrocracking of hydrocarbon-based fractions.

The catalyst according to the invention, and which has preferably undergone a sulfurized step beforehand, is advantageously used for the hydrotreating and/or hydrocracking reactions of hydrocarbon-based feedstocks such as petroleum fractions, fractions derived from coal or hydrocarbons produced from natural gas, optionally as mixtures or else from a hydrocarbon-based fraction derived from biomass and more particularly for hydrogenation, hydrodeazotization, hydrodearomatization, hydrodesulfurization, hydrodeoxygenation, hydrodemetallation or hydroconversion reactions of hydrocarbon-based feedstocks.

In these uses, the catalyst according to the invention, and which has preferably undergone a sulfurization step beforehand, has improved activity relative to the catalysts of the prior art. This catalyst may also advantageously be used in the pretreatment of catalytic cracking or hydrocracking feedstocks, or the hydrodesulfurization of residues or the forced hydrodesulfurization of gas oils (ULSD: ultra-low-sulfur diesel).

The feedstocks used in the hydrotreating process are, for example, gasolines, gas oils, vacuum gas oils, atmospheric residues, vacuum residues, atmospheric distillates, vacuum distillates, heavy fuel oils, oils, waxes and paraffins, used oils, deasphalted residues or crudes, feedstocks originating from thermal or catalytic conversion processes, lignocellulosic feedstocks, or, more generally, feedstocks derived from biomass, taken alone or as a mixture. The feedstocks that are treated, and in particular those mentioned above, generally contain heteroatoms such as sulfur, oxygen and nitrogen and, for heavy feedstocks, they usually also contain metals.

The operating conditions used in the processes involving reactions for hydrotreating hydrocarbon feedstocks described above are generally the following: the temperature is advantageously between 180° C. and 450° C., and preferably between 250° C. and 440° C., the pressure is advantageously between 0.5 and 30 MPa, and preferably between 1 and 18 MPa, the hourly space velocity is advantageously between 0.1 and 20 $h^{-1}$ and preferably between 0.2 and 5 $h^{-1}$, and the hydrogen/feedstock ratio expressed as the volume of hydrogen, measured under normal temperature and pressure conditions, per volume of liquid feedstock is advantageously between 50 l/l to 5000 l/l and preferably 80 to 2000 l/l.

According to a first mode of use, said hydrotreating process according to the invention is a process for the hydrotreating, and notably for the hydrodesulfurization (HDS), of a gas oil fraction performed in the presence of at least one catalyst according to the invention. Said hydrotreating process according to the invention is directed toward removing the sulfur-based compounds present in said gas oil fraction so as to meet the environmental standards in force, namely a permitted sulfur content of up to 10 ppm. It also makes it possible to reduce the contents of aromatics and of nitrogen of the gas oil fraction to be hydrotreated.

Said gas oil fraction to be hydrotreated according to the process of the invention contains from 0.02% to 5.0% by weight of sulfur. It is advantageously derived from the straight-run distillation (or the straight-run gas oil) of a coking unit, of a visbreaking unit, of a steam cracking unit, of a unit for hydrotreating and/or hydrocracking heavier feedstocks and/or of a catalytic cracking unit (fluid catalytic cracking). Said gas oil fraction preferentially contains at least 90% of compounds with a boiling point between 250° C. and 400° C. at atmospheric pressure.

The process for hydrotreating said gas oil fraction according to the invention is performed under the following operating conditions: a temperature of between 200 and 400° C., preferentially between 300 and 380° C., a total pressure of between 2 MPa and 10 MPa and more preferentially between 3 MPa and 8 MPa with a ratio of the volume of hydrogen per volume of hydrocarbon-based feedstock, expressed as volume of hydrogen, measured under normal temperature and pressure conditions, per volume of liquid feedstock, of between 100 and 600 liters per liter and more preferentially between 200 and 400 liters per liter, and an hourly space velocity (HSV) of between 1 and 10 $h^{-1}$, preferentially between 2 and 8 $h^{-1}$. The HSV corresponds to the inverse of the contact time expressed in hours and is defined by the ratio of the volume flow rate of liquid hydrocarbon-based feedstock per volume of catalyst loaded into the reaction unit performing the hydrotreating process according to the invention. The reaction unit performing the process for hydrotreating said gas oil fraction according to the invention is preferentially performed in a fixed bed, in a moving bed or in a boiling bed, preferably in a fixed bed.

According to a second mode of use, said hydrotreating and/or hydrocracking process according to the invention is a process for the hydrotreating (notably hydrodesulfurization, hydrodeazotization, hydrogenation of aromatics) and/or hydrocracking of a vacuum distillate fraction performed in the presence of at least one catalyst according to the invention. Said hydrotreating and/or hydrocracking process, also referred to as hydrocracking pretreatment or hydrocracking process according to the invention, is directed, depending on the case, toward removing the sulfur-based, nitrogen-based or aromatic compounds present in said distillate fraction so as to perform a pretreatment before conversion in catalytic cracking or hydroconversion processes, or toward hydrocracking the distillate fraction which may optionally have been pretreated beforehand, if necessary.

Very varied feedstocks may be treated via the vacuum distillate hydrotreating and/or hydrocracking processes described above. Generally, they contain at least 20% by volume and often at least 80% by volume of compounds boiling above 340° C. at atmospheric pressure. The feedstock may be, for example, vacuum distillates and also feedstocks derived from units for extraction of aromatics from lubricant oil bases or derived from the solvent deparaffining of lubricant oil bases, and/or of deasphalted oils, or the feedstock may be a deasphalted oil or paraffins derived from the Fischer-Tropsch process, or any mixture of the feedstocks mentioned previously. In general, the feedstocks have a T5 boiling point above 340° C. at atmospheric pressure, and better still above 370° C. at atmospheric pressure, i.e. 95% of the compounds present in the feedstock have a boiling point above 340° C. and better still above 370° C. The nitrogen content of the feedstocks treated in the processes according to the invention is usually greater than 200 ppm by weight, preferably between 500 and 10 000 ppm by weight. The sulfur content of the feedstocks treated in the processes according to the invention is usually between 0.01% and 5.0% by weight. The feedstock may optionally contain metals (for example nickel and vanadium). The asphaltene content is generally less than 3000 ppm by weight.

The hydrotreating and/or hydrocracking catalyst is generally placed in contact, in the presence of hydrogen, with the feedstocks described previously, at a temperature above 200° C., usually between 250° C. and 480° C., advantageously between 320° C. and 450° C., preferably between 330° C. and 435° C., at a pressure above 1 MPa, usually between 2 and 25 MPa, preferably between 3 and 20 MPa, the space velocity being between 0.1 and 20.0 $h^{-1}$ and preferably 0.1-6.0 $h^{-1}$, preferably 0.2-3.0 $h^{-1}$, and the amount of hydrogen introduced is such that the volume ratio of a liter of hydrogen/liter of hydrocarbon, expressed as volume of hydrogen, measured under normal temperature and pressure conditions, per volume of liquid feedstock, is between 80 and 5000 l/l and usually between 100 and 2000 l/l. These operating conditions used in the processes according to the invention generally make it possible to obtain conversions per pass, into products having boiling points of less than 340° C. at atmospheric pressure, and better still less than 370° C. at atmospheric pressure, of greater than 15% and even more preferably between 20% and 95%.

The vacuum distillate hydrotreating and/or hydrocracking processes using the catalysts according to the invention cover pressure ranges and conversion ranges extending from mild hydrocracking to high-pressure hydrocracking. The term "mild hydrocracking" refers to hydrocracking which leads to moderate conversions, generally of less than 40%, and which operates at low pressure, preferably between 2 MPa and 6 MPa.

The catalyst according to the invention may be used alone, in one or more fixed-bed catalytic beds, in one or more reactors, in a "one-step" hydrocracking scheme, with or without liquid recycling of the unconverted fraction, or in a "two-step" hydrocracking scheme, optionally in combination with a hydrorefining catalyst located upstream of the catalyst of the present invention.

According to a third mode of use, said hydrotreating and/or hydrocracking process according to the invention is advantageously performed as a pretreatment in a fluidized-bed catalytic cracking (or FCC: fluid catalytic cracking) process. The operating conditions of the pretreatment in terms of temperature range, pressure, hydrogen recycling rate and hourly space velocity are generally identical to those described above for the vacuum distillate hydrotreating and/or hydrocracking processes. The FCC process may be conducted in a conventional manner known to those skilled in the art under suitable cracking conditions for the purpose of producing hydrocarbon-based products of smaller molecular weight. A summary description of catalytic cracking will be found, for example, in Ullmann's Encyclopedia of Industrial Chemistry volume A18, 1991, pages 61 to 64.

According to a fourth mode of use, said hydrotreating and/or hydrocracking process according to the invention is a process for the hydrotreating (notably for the hydrodesulfurization) of a gasoline fraction in the presence of at least one catalyst according to the invention.

Unlike other hydrotreating processes, the hydrotreating (notably the hydrodesulfurization) of gasolines must make it possible to address a twofold conflicting constraint: ensuring in-depth hydrodesulfurization of the gasolines and limiting the hydrogenation of the unsaturated compounds present so as to limit the loss of octane number.

The feedstock is generally a hydrocarbon fraction with a distillation range of between 30 and 260° C. Preferably, this hydrocarbon fraction is a fraction of the gasoline type. Very preferably, the gasoline fraction is an olefinic gasoline fraction derived, for example, from a catalytic cracking unit (fluid catalytic cracking).

The hydrotreating process consists in placing the hydrocarbon fraction in contact with the catalyst according to the invention and hydrogen under the following conditions: at a temperature of between 200 and 400° C., preferably between 230 and 330° C., at a total pressure of between 1 and 3 MPa, preferably between 1.5 and 2.5 MPa, at an hourly space velocity (HSV), defined as being the volume flow rate of feedstock relative to the volume of catalyst, of between 1 and 10 $h^{-1}$, preferably between 2 and 6 $h^{-1}$, and at a hydrogen/gasoline feedstock volume ratio of between 100 and 600 Nl/l, preferably between 200 and 400 Nl/l.

The gasoline hydrotreating process may be performed in one or more reactors in series of the fixed-bed type or of the boiling-bed type. If the process is performed using at least two reactors in series, it is possible to provide a device for removing the $H_2S$ from the effluent derived from the first hydrodesulfurization reactor before treating said effluent in the second hydrodesulfurization reactor.

The examples that follow demonstrate the substantial gain in activity on the catalysts prepared according to the process of the invention relative to the catalysts of the prior art and specify the invention without, however, limiting the scope thereof.

EXAMPLES

Example 1

Preparation of CoMoP Catalysts on Alumina without Organic Compound C1 and C2 (Not in Accordance with the Invention)

To an alumina support having a BET specific surface area of 230 m²/g, a pore volume measured by mercury porosimetry of 0.78 ml/g and a mean pore diameter of 11.5 nm defined as the volume median diameter by mercury porosimetry and which is in "extrudate" form, are added cobalt, molybdenum and phosphorus. The impregnation solution is prepared by dissolving, at 90° C., molybdenum oxide (21.1 g) and cobalt hydroxide (5.04 g) in 11.8 g of an aqueous solution of phosphoric acid at 85% by weight. After dry impregnation, the extrudates are left to mature in a water-saturated atmosphere for 24 hours at room temperature, and are then dried at 90° C. for 16 hours. The dried catalyst precursor thus obtained is denoted C1. Calcination of the catalyst precursor C1 at 450° C. for 2 hours leads to the calcined catalyst C2. The final metal composition of the catalyst precursor C1 and of the catalyst C2 expressed in the form of oxides and relative to the weight of dry catalyst is then the following: $MoO_3$=19.5±0.2 wt %, CoO=3.8±0.1 wt % and $P_2O_5$=6.7±0.1 wt %.

Example 2

Preparation of CoMoP Catalysts on Alumina C3 (Not in Accordance with the Invention) and C4 (In Accordance with the Invention) by Co-Impregnation To the alumina support described previously in example 1 and which is in the "extrudate" form are added cobalt, molybdenum and phosphorus. The impregnation solution is prepared by dissolving, at 90° C., molybdenum oxide (28.28 g) and cobalt hydroxide (6.57 g) in 15.85 g of an aqueous 85% solution of phosphoric acid and water. After homogenization of the preceding mixture, 38 g of citric acid were added before adjusting the volume of solution to the pore volume of the support by addition of water. The (citric acid)/Mo mole ratio is equal to 1 mol/mol and the (citric acid)/Co mole ratio is equal to 2.7 mol/mol. After dry impregnation, the extrudates are left to mature in a water-saturated atmosphere for 24 hours at room temperature, and are then dried at 120° C. for 16 hours. The dried catalyst additive-impregnated with citric acid thus obtained is denoted C3. The final composition of the catalyst C3 expressed in the form of oxides and relative to the weight of dry catalyst is then the following: $MoO_3$=19.6±0.2 wt %, CoO=3.7±0.1 wt % and $P_2O_5$=6.7±0.1 wt %.

The catalyst C4 according to the invention is prepared as follows. To the alumina support described in example 1 and which is in the "extrudate" form are added cobalt, molybdenum and phosphorus. An impregnation solution was prepared by dissolving, at 90° C., molybdenum oxide (39 g) and cobalt hydroxide (9.3 g) in 21.9 g of an aqueous 85% solution of phosphoric acid and water. After homogenization of the preceding mixture, 5-(hydroxymethyl)furfural was added to the solution in a proportion of 0.8 mol per mole of molybdenum, i.e. 2.2 mol per mole of cobalt, to give the catalyst precursor C4. The volume of the solution was adjusted to the pore volume of the support by adding water before the impregnation. After dry impregnation, the catalyst precursor extrudates were left to mature in a water-saturated atmosphere for 24 hours at room temperature, and then dried at 120° C. for 16 hours. The final composition of the catalyst C4 expressed in the form of oxides and relative to the weight of the dry catalyst is then the following: $MoO_3$=19.5±0.2 wt %, CoO=3.5±0.1 wt % and $P_2O_{5=6.8\pm0.1}$ wt %.

Example 3

Preparation of the CoMoP Catalyst on Alumina C5 (In Accordance with the Invention) by Post-Impregnation 18 g of catalyst precursor C1 described previously in example 1 and which is in the "extrudate" form are impregnated with an aqueous solution containing 2.5 g of 5-(hydroxymethyl)furfural and the volume of which is equal to the pore volume of the catalyst precursor C1. The amounts used are such that the amount of 5-(hydroxymethyl)furfural is 0.8 mol per mole of molybdenum (corresponding to 2.2 mol per mole of cobalt). The extrudates are left to mature in a water-saturated atmosphere for 16 hours at room temperature. The catalyst precursor C5 is then dried at 120° C. for 2 hours to give the catalyst C5. The final metal composition of the catalyst C5 relative to the weight of dry catalyst is: $MoO_3$=19.5±0.2 wt %, CoO=3.8±0.1 wt % and $P_2O_5$=6.7±0.1 wt %.

Example 4

Preparation of the CoMoP Catalyst on Alumina C6 (According to the Invention) by Introduction of an Organic Compound in the Vapor Phase After the Impregnation of the Metals 2.75 g of 2-acetylfuran contained in a crystallizing dish are placed in a closed chamber. 12 g of the catalyst precursor C1 are introduced into the same closed chamber and placed on a stainless-steel grid so that the liquid 2-acetylfuran is not in physical contact with the catalyst precursor C1. The closed chamber is placed in an oven at 120° C. for 2 hours. 13.4 g of catalyst C6 are thus obtained after the catalyst precursor C1 has been brought together with the 2-acetylfuran compound in liquid form. The amount of 2-acetylfuran thus transferred onto the catalyst is such that the 2-acetylfuran/Mo mole ratio is 0.8 mol per mole of molybdenum (corresponding to 2.2 mol per mole of cobalt). The final metal composition of the catalyst C6 relative to the weight of dry catalyst is: $MoO_3$=19.5±0.2 wt %, CoO=3.8±0.1 wt % and $P_2O_5$=6.7±0.1 wt %.

Example 5

Preparation of the CoMoP Catalyst on Alumina C7 (According to the Invention) by Introduction of an Organic Compound in the Vapor Phase After the Impregnation of the Metals 2.75 g of 5-methyl-2-furaldehyde contained in a crystallizing dish are placed in a closed chamber. 12 g of the catalyst precursor C1 are introduced into the same closed chamber and placed on a stainless-steel grid so that the liquid 5-methyl-2-furaldehyde is not in physical contact with the catalyst precursor C1. The closed chamber is placed in an oven at 120° C. for 2 hours. 13.4 g of catalyst C7 are thus obtained after the catalyst precursor C1 has been brought together with the 5-methyl-2-furaldehyde compound in liquid form. The amount of 5-methyl-2-furaldehyde thus transferred onto the catalyst is such that the 5-methyl-2-furaldehyde/Mo mole ratio is 0.8 mol per mole of molybdenum (corresponding to 2.2 mol per mole of cobalt). The final metal composition of the catalyst C7 relative to the weight of dry catalyst is: $MoO_3$=19.5±0.2 wt %, CoO=3.8±0.1 wt % and $P_2O_5$=6.7±0.1 wt %.

Example 6

Preparation of the CoMoP Catalyst on Alumina C8 (According to the Invention) by Introduction of an Organic Compound in the Vapor Phase After the Impregnation of the Metals 3.15 g of methyl 2-furoate contained in a crystallizing dish are placed in a closed chamber. 12 g of the catalyst precursor C1 are introduced into the same closed chamber and placed on a stainless-steel grid so that the liquid methyl 2-furoate is not in physical contact with the catalyst precursor C1. The closed chamber is placed in an oven at 120° C. for 2 hours. 13.6 g of catalyst C8 are thus obtained after the catalyst precursor C1 has been brought together with the methyl 2-furoate compound in liquid form. The amount of methyl 2-furoate thus transferred onto the catalyst is such that the methyl 2-furoate/Mo mole ratio is 0.8 mol per mole of molybdenum (corresponding to 2.2 mol per mole of cobalt). The final metal composition of the catalyst C8 relative to the weight of dry catalyst is: $MoO_3$=19.5±0.2 wt %, CoO=3.8±0.1 wt % and $P_2O_5$=6.7±0.1 wt %.

Example 7

Preparation of the CoMoP Catalyst on Alumina C9 (According to the Invention) by Introduction of an Organic Compound in the Vapor Phase After the Impregnation of the Metals 2.4 g of 2-furaldehyde contained in a crystallizing dish are placed in a closed chamber. 12 g of the catalyst precursor C1 are introduced into the same closed chamber and placed on a stainless-steel grid so that the liquid 2-furaldehyde is not in physical contact with the catalyst precursor C1. The closed chamber is placed in an oven at 120° C. for 2 hours. 13.2 g of catalyst C9 are thus obtained after the catalyst precursor C1 has been brought together with the 2-furaldehyde compound in liquid form. The amount of 2-furaldehyde thus transferred onto the catalyst is such that the 2-furaldehyde/Mo mole ratio is 0.8 mol per mole of molybdenum (corresponding to 2.2 mol per mole of cobalt). The final metal composition of the catalyst C9 relative to the weight of dry catalyst is: $MoO_3$=19.5±0.2 wt %, CoO=3.8±0.1 wt % and $P_2O_5$=6.7±0.1 wt %.

Example 8

Evaluation in the Hydrodesulfurization (HDS) of Gas Oil of the Catalysts C1, C2 and C3 (Not in Accordance with the Invention) and C4, C5, C6, C7, C8 and C9 (In Accordance with the Invention)

The catalysts C1, C2 and C3 (not in accordance with the invention) and C4, C5, C6, C7, C8 and C9 (in accordance with the invention) were tested in the HDS of gas oil. The characteristics of the gas oil feedstock used are as follows: density at 15° C.=0.8522 g/cm$^3$, sulfur content=1.44% by weight.

Simulated distillation:

IP: 155° C.

10%:247° C.

50%:315° C.

90%: 392° C.

FP: 444° C.

The test is performed in an isothermal crossed fixed-bed pilot reactor, the fluids circulating from the bottom upward.

The catalyst precursors are first sulfurized in situ at 350° C. in the reactor under pressure by means of the gas oil of the test to which 2% by weight of dimethyl disulfide are added.

The hydrodesulfurization tests were performed under the following operating conditions: a total pressure of 7 MPa, a catalyst volume of 30 cm$^3$, a temperature of from 330 to 360° C., with a hydrogen flow rate of 24 l/h and with a feedstock flow rate of 60 cm$^3$/h.

The catalytic performances of the catalysts tested are given in table 1. They are expressed in degrees Celsius relative to the (comparative) catalyst C2 chosen as reference: they correspond to the temperature difference to be applied in order to attain 50 ppm of sulfur in the effluent. A negative value means that the target sulfur content is attained for a lower temperature and that there is therefore an increase in activity. A positive value means that the target sulfur content is attained for a higher temperature and that there is therefore a loss of activity.

Table 1 clearly shows the gain on the catalytic effect afforded by the organic compounds according to the invention. Specifically, catalysts C4, C5, C6, C7, C8 and C9 (according to the invention) have higher activities than those obtained for all the other catalysts evaluated. The furan compounds thus afford a gain in catalytic activity irrespective of their method of introduction: co-impregnation with the metals, introduction after impregnation of the metals (post-impregnation) in solution and gas-phase introduction after impregnation of the metals.

The advantage of the catalysts according to the invention is significant although they have a lower proportion of organic compound than the catalyst C3 with, thus, a higher intrinsic efficacy than that of the other compounds, for which it is necessary to introduce a larger proportion of compound to observe a substantial catalytic effect.

TABLE 1

Isovolumic relative activities in the hydrodesulfurization of gas oil for the catalysts C1 and C3 (not in accordance with the invention) and C4, C5, C6, C7, C8 and C9 (in accordance with the invention) relative to the catalyst C2 (not in accordance).

| Catalyst (comparative or according to the invention) | Organic compound used and compound/Mo mole ratio | Method of introducing the organic compound | HDS activity |
|---|---|---|---|
| C1 (comp) | none | N/A | Base +1.0° C. |
| C2 (comp) | none | N/A | Base |
| C3 (comp) | Citric acid- 1.0 mol/mol Mo | Co-impregnation | Base -2.9° C. |
| C4 (inv) | 5-(Hydroxymethyl)furfural- 0.8 mol/mol Mo | Co-impregnation | Base -5.8° C. |
| C5 (inv) | 5-(Hydroxymethyl)furfural- 0.8 mol/mol Mo | Post-additivation | Base -5.9° C. |
| C6 (inv) | 2-Acetylfuran- 0.8 mol/mol Mo | Gas phase after impregnation of the metals | Base -7.0° C. |
| C7 (inv) | 5-Methyl-2-furaldehyde- 0.8 mol/mol Mo | Gas phase after impregnation of the metals | Base -7.2° C. |
| C8 (inv) | Methyl 2-furoate- 0.8 mol/mol Mo | Gas phase after impregnation of the metals | Base -4.6° C. |
| C9 (inv) | 2-Furaldehyde - 0.8 mol/mol Mo | Gas phase after impregnation of the metals | Base -5.3° C. |

The invention claimed is:

1. A catalyst comprising a support based on alumina or silica or silica-alumina, at least one Group VIII element, at least one Group VIB element and a furan compound.

2. The catalyst as claimed in claim 1, in which the furan compound is of formula (I)

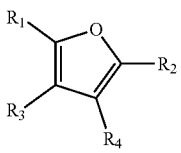

(I)

in which
  each of the radicals $R_1$, $R_2$, $R_3$ and $R_4$ is chosen from a hydrogen atom, a linear or branched or cyclic hydrocarbon-based radical including from 1 to 20 carbon atoms, and a function selected from: aldehyde —C(O)H, ketone —C(O)$R_5$, carboxylic acid —COOH, ester —COO$R_6$, hydroxymethyl —CH$_2$OH, alkoxymethyl —CH$_2$O$R_7$, halomethyl —CH$_2$X with X=Cl, Br or I, acyl halide —COX with X=Cl, Br or I, alcohol —OH, ether O$R_8$, thiomethyl —CH$_2$SH, (alkylsulfanyl)methyl —CH$_2$S$R_9$, and thioester —COS$R_{10}$,
  each of the radicals $R_5$ to $R_{10}$ representing a linear or branched or cyclic hydrocarbon-based radical of 1 to 20 carbon atoms, and
  wherein each of said radicals $R_1$, $R_2$, $R_3$, $R_4$, $R_5$, $R_6$, $R_7$, $R_8$, $R_9$ and $R_{10}$ optionally also including a heteroatom, a halogen, and/or at least one function chosen from a hydroxyl function, an aldehyde function, a ketone function, a carboxylic function, an alkanoate function, a thiol function, an alkylsulfanyl function, a thioalkanoate function, and an amine function.

3. The catalyst as claimed in claim 2, in which each of $R_3$ and $R_4$ is a hydrogen atom.

4. The catalyst as claimed in claim 1, in which the furan compound is chosen from 2-methylfuran, 2,5-dimethylfuran, furfuryl alcohol, 1-(2-furyl)ethanol, 2,5-bis(hydroxymethyl)furan, 5-(hydroxymethyl)furfural, 5-hydroxymethyl-2-furoic acid, 2-methoxyfuran, 2-furaldehyde, 5-methyl-2-furaldehyde, 5-(ethoxymethyl)furan-2-carboxaldehyde, 5-acetoxymethyl-2-furaldehyde, 5-chloromethylfurfural, 2,5-diformylfuran, 2-acetylfuran, 2-acetyl-5-methylfuran, furoic acid, 5-ethylfuroic acid, 5-formyl-2-furoic acid, 2,5-furandicarboxylic acid, dimethyl 2,5-furandicarboxylate, methyl 2-furoate, methyl 5-methyl-2-furoate, furfuryl acetate, furfuryl propionate, furfuryl mercaptan, 2-[(methylsulfanyl)methyl]furan, 2-furanmethanethiol formate, furfuryl thioacetate, furfuryl thiopropionate, methyl 2-thiofuroate, ethyl 3-(furfurylthio)propionate, furfurylamine, and 2-furoyl chloride.

5. The catalyst as claimed in claim 1, in which the furan compound is a polyfuran compound of formula (II)

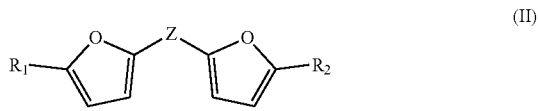

(II)

in which
  Z is an oxygen atom, a sulfur atom, or a linear or branched or cyclic hydrocarbon-based radical including from 1 to 20 carbon atoms, and which optionally includes a heteroatom, a halogen and/or at least one function chosen from a hydroxyl function, an aldehyde function, a ketone function, a carboxylic function, an alkanoate function, a thiol function, an alkylsulfanyl function, a thioalkanoate function and an amine function, and
  each of the radicals $R^1$ and $R^2$ is chosen from a hydrogen atom, a linear or branched or cyclic hydrocarbon-based radical including from 1 to 20 carbon atoms, and a function selected from: aldehyde —C(O)H, ketone —C(O)$R_5$, carboxylic acid —COOH, ester —COO$R_6$, hydroxymethyl —CH$_2$OH, alkoxymethyl —CH$_2$O$R_7$, halomethyl —CH$_2$X with X=Cl, Br or I, acyl halide —COX with X=Cl, Br or I, alcohol —OH, ether O$R_8$, thiomethyl —CH$_2$SH, (alkylsulfanyl)methyl —CH$_2$S$R_9$, thioester —COS$R_{10}$, and
  each of the radicals $R_5$ to $R_{10}$ representing a linear or branched or cyclic hydrocarbon-based radical of 1 to 20 carbon atoms,
  wherein each of said radicals $R_1$, $R_2$, $R_5$, $R_6$, $R_7$, $R_8$, $R_9$ and $R_{10}$ optionally including a heteroatom, a halogen, and/or at least one function chosen from a hydroxyl function, an aldehyde function, a ketone function, a carboxylic function, an alkanoate function, a thiol function, an alkylsulfanyl function, a thioalkanoate function, and an amine function.

6. The catalyst as claimed in claim 5, in which the furan compound is chosen from bis(5-formylfurfuryl) ether, 2,2'-(thiodimethylene)difuran and 5,5-bis(5-methyl-2-furanyl)-2-pentanone.

7. The catalyst as claimed in claim 1, in which the content of Group VIB element is between 5% and 40% by weight expressed as Group VIB metal oxide relative to the total weight of the catalyst, and the content of Group VIII element is between 1% and 10% by weight expressed as Group VIII metal oxide relative to the total weight of the catalyst.

8. The catalyst as claimed in claim 1, in which a mole ratio of Group VIII element to Group VIB element in the catalyst is between 0.1 and 0.8.

9. The catalyst as claimed in claim 1, further comprising phosphorus, wherein the phosphorus content is between 0.1% and 20% by weight expressed as $P_2O_5$ relative to the total weight of the catalyst, and a mole ratio of phosphorus to the Group VIB element in the catalyst is greater than or equal to 0.05.

10. The catalyst as claimed in claim 1, in which the content of furan compound is between 1% and 45% by weight relative to the total weight of the catalyst.

11. The catalyst as claimed in claim 1, further comprising an organic compound, other than the furan compound, which contains oxygen and/or nitrogen and/or sulfur.

12. The catalyst as claimed in claim 11, in which the organic compound is a compound having one or more chemical functions chosen from carboxylic, alcohol, thiol, thioether, sulfone, sulfoxide, ether, aldehyde, ketone, ester, carbonate, amine, nitrile, imide, oxime, urea, and amide functions.

13. The catalyst as claimed in claim 12, in which the organic compound is γ-valerolactone, 2-acetylbutyrolactone, triethylene glycol, diethylene glycol, ethylene glycol, ethylenediaminetetraacetic acid (EDTA), maleic acid, malonic acid, citric acid, γ-ketovaleric acid, dimethylformamide, N-methylpyrrolidone, propylene carbonate, 2-methoxyethyl 3-oxobutanoate, 2-methacryloyloxyethyl 3-oxobutanoate, bicine, tricine, or a lactam.

14. The catalyst as claimed in claim 1, which is at least partially sulfurized.

15. A process for preparing a catalyst as claimed in claim 1, comprising:
   a. placing a compound including a Group VIB element, at least one compound including a Group VIII element, furan compound, and optionally phosphorus in contact with a support based on alumina or silica or silica-alumina, or placing a regenerated catalyst containing a support based on alumina or silica or silica-alumina, at least one Group VIB element, at least one Group VIII element, and optionally phosphorus in contact with a furan compound, so as to obtain a catalyst precursor, and
   b. drying said catalyst precursor derived from step a) at a temperature below 200° C., without subsequently calcining it.

16. A process for preparing a catalyst as claimed in claim 1, comprising:
   i) depositing the furan compound on a support based on alumina or silica or silica-alumina by performing a step in which said support and the furan compound in liquid form are brought together simultaneously and without any physical contact between the support and the furan compound in liquid form, at a temperature below the boiling point of the furan compound and under pressure and time conditions such that a fraction of said furan compound is transferred in gaseous form to the support,
   ii) placing at least one compound including a Group VIB element, at least one compound including a Group VIII element, and optionally phosphorus in contact with the support based on alumina or silica or silica-alumina to obtain a solid, and
   iii) drying the solid obtained on conclusion of step ii), wherein step i) is performed before or after steps ii) and iii) or during step iii).

17. A process for preparing the catalyst as claimed in claim 1, comprising:
   i') depositing the furan compound onto a support based on alumina or silica or silica-alumina by performing a step in which the support is brought together, in a closed or open chamber, with a porous solid containing a furan compound, this step being performed under temperature, pressure and time conditions such that a fraction of said furan compound is transferred in gaseous form from the porous solid to the support,
   ii) placing at least one compound including a Group VIB element, at least one compound including a Group VIII element, and optionally phosphorus in contact with the support based on alumina or silica or silica-alumina to obtain a solid, and
   iii) drying the solid obtained on conclusion of step ii), wherein step i') is performed separately before or after steps ii) and iii).

18. A process for preparing the catalyst as claimed in claim 1, comprising the following steps:
   i") depositing the furan compound on a regenerated catalyst containing a support based on alumina or silica or silica-alumina, at least one Group VIB element, at least one Group VIII element, and optionally phosphorus, by performing a step in which said regenerated catalyst and the furan compound in liquid form are brought together simultaneously and without any physical contact between the catalyst and the furan compound in liquid form, at a temperature below the boiling point of the furan compound and under pressure and time conditions such that a fraction of said furan compound is transferred in gaseous form to the catalyst, or
   i''') depositing the furan compound onto a regenerated catalyst containing a support based on alumina or silica or silica-alumina, at least one Group VIB element, at least one Group VIII element and optionally phosphorus, by performing a step in which the catalyst is brought together, in a closed or open chamber, with a porous solid containing a furan compound, this step being performed under temperature, pressure and time conditions such that a fraction of said furan compound is transferred in gaseous form from the porous solid to the catalyst.

19. A process for hydrotreating and/or hydrocracking a hydrocarbon-based fraction comprising contacting said fraction with a catalyst according to claim 1.

* * * * *